US010205934B2

(12) United States Patent
Jung

(10) Patent No.: US 10,205,934 B2
(45) Date of Patent: Feb. 12, 2019

(54) DISPLAY DEVICE FOR PERSONAL IMMERSIVE DEVICE

(71) Applicant: LG Display Co., Ltd., Seoul (KR)

(72) Inventor: Sanghoon Jung, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 65 days.

(21) Appl. No.: 15/283,225

(22) Filed: Sep. 30, 2016

(65) Prior Publication Data
US 2017/0195658 A1 Jul. 6, 2017

(30) Foreign Application Priority Data
Dec. 31, 2015 (KR) .......................... 10-2015-0191800

(51) Int. Cl.
H04N 13/344 (2018.01)
G09G 3/00 (2006.01)
(Continued)

(52) U.S. Cl.
CPC .......... *H04N 13/344* (2018.05); *G09G 3/003* (2013.01); *G09G 3/2003* (2013.01); *G09G 3/3233* (2013.01); *G09G 3/3258* (2013.01); *H04N 13/00* (2013.01); *H04N 13/324* (2018.05); *H04N 13/398* (2018.05); *G02B 27/22* (2013.01); *G09G 2300/0404* (2013.01); *G09G 2300/0426* (2013.01); *G09G 2300/0452* (2013.01); *G09G 2300/0814* (2013.01); *G09G 2300/0852* (2013.01); *G09G 2300/0861* (2013.01);
(Continued)

(58) Field of Classification Search
CPC ................................................... H04N 13/044
See application file for complete search history.

(56) References Cited

U.S. PATENT DOCUMENTS 8,508,830 B1 8/2013 Wang
8,705,177 B1 4/2014 Miao
(Continued)

FOREIGN PATENT DOCUMENTS

CN 1864198 A 11/2006
JP 2000-199886 A 7/2000
(Continued)

OTHER PUBLICATIONS

European Extended Search Report, European Application No. 16202877.3, dated Mar. 31, 2017, 5 pages.
(Continued)

Primary Examiner — Tung T Vo
Assistant Examiner — Rowina J Cattungal
(74) Attorney, Agent, or Firm — Fenwick & West LLP

(57) ABSTRACT

A display device for virtual reality. A first display panel comprises a first pixel row having a first end and a second end that is closer to the second display panel than the first end. The first pixel row has a first arrangement of unit pixels that alternate between a first unit pixel type and a second unit pixel type. A second display panel comprises a second pixel row aligned with the first pixel row and having a third end and a fourth end that is further from the first display panel than the third end. A first unit pixel at the first end of the first pixel row is the first unit pixel type, and a second unit pixel at the third end of the second pixel row is the second unit pixel type.

17 Claims, 17 Drawing Sheets

(51) Int. Cl.
    *G09G 3/3233* (2016.01)
    *H04N 13/324* (2018.01)
    *H04N 13/398* (2018.01)
    *G09G 3/20* (2006.01)
    *G09G 3/3258* (2016.01)
    *H04N 13/00* (2018.01)
    *G02B 27/22* (2018.01)

(52) U.S. Cl.
    CPC .. *G09G 2310/08* (2013.01); *G09G 2320/0242* (2013.01); *H04N 2013/0077* (2013.01)

(56) References Cited

U.S. PATENT DOCUMENTS

| | | |
|---|---|---|
| 2003/0058210 A1 | 3/2003 | Yamazaki et al. |
| 2007/0097021 A1 | 5/2007 | Yamazaki et al. |
| 2010/0141693 A1* | 6/2010 | Lee .............. G09G 3/3216 345/694 |
| 2013/0033575 A1* | 2/2013 | Kobayashi ........ G02B 27/26 348/46 |
| 2016/0097931 A1* | 4/2016 | Takahota .......... G02B 27/01 345/690 |

FOREIGN PATENT DOCUMENTS

| | | |
|---|---|---|
| JP | 2006-511829 A | 4/2006 |
| TW | 200905637 A | 2/2009 |
| WO | WO 2004/021323 A2 | 3/2004 |

OTHER PUBLICATIONS

Japanese Office Action, Japanese Application No. 2016-242818, dated Feb. 20, 2018, 3 pages (with concise explanation of relevance).

First Office Action, Chinese Patent Application No. 201610937108.2, dated Oct. 19, 2018, 15 pages.

* cited by examiner (a)

→ 
(b)

DISPLAY DEVICE FOR PERSONAL IMMERSIVE DEVICE

CROSS REFERENCE TO RELATED APPLICATIONS

This application claims the benefit of priority under 35 U.S.C. § 119(a) to Republic of Korea Patent Application No. 10-2015-0191800 filed on Dec. 31, 2015, the entire contents of which is incorporated herein by reference for all purposes as if fully set forth herein.

BACKGROUND

Field of the Disclosure

The present disclosure relates to a display device for a personal immersive device implementing virtual reality or augmented reality.

Discussion of the Related Art

Technologies for virtual reality or augmented reality (hereinafter, commonly referred to as "virtual reality") have been applied to a defense field, an architecture field, a tourist field, a film field, a multimedia field, a game field, and the like. Virtual reality means a specific environment or a specific situation allowing a user to feel as a real environment using a stereoscopic image technology.

The virtual reality technology has been applied to personal immersive devices, so as to maximize the immersion of the virtual reality. Examples of the personal immersive device include a head mounted display (HMD), a face mounted display (FMD), and an eye glasses-type display (EGD).

Because the user wears the personal immersive device on his or her face or head, a distance between the user's eyes and the screen is very short. For this reason, the personal immersive device is implemented as an organic light emitting diode (OLED) display having a self-emission structure. Further, the personal immersive device has used a pentile matrix scheme, in which a total of four subpixels (for example, red (R), green (G), blue (B), and green (G) subpixels) form two unit pixels, instead of a related art pixel structure, in which a total of three red, green, and blue subpixels form a unit pixel.

However, when a pixel structure of the pentile matrix scheme is applied to the personal immersive device, and a first OLED display panel, on which a left eye input is displayed, and a second OLED display panel, on which a right eye input is displayed, represent a specific color, the specific color is not represented on some of four unit pixels. Hence, there was a problem of a reduction in pixel density of each color.

This is described in detail below with reference to FIG. 1.

FIG. 1 illustrates a problem of a pixel array applied to a related art personal immersive device.

Referring to FIG. 1, R, B, G, and B subpixels are arranged on a first row of a pixel array of a first OLED display panel, to which a left eye image is input, in the order named, and G, B, R, and B subpixels are arranged on a second row of the pixel array in the order named. Further, R, B, G, and B subpixels are arranged on a first row of a pixel array of a second OLED display panel, to which a right eye image is input, in the order named in the same manner as the first row of the pixel array of the first OLED display panel, and G, B, R, and B subpixels are arranged on a second row of the pixel array in the order named in the same manner as the second row of the pixel array of the first OLED display panel.

The left eye image received through a left eye of a human being and the right eye image received through a right eye of the human being are combined in a brain of the human being. Hence, two adjacent unit pixels on the first row are recognized as RBGB, and two adjacent unit pixels on the second row are recognized as GBRB.

Thus, two red colors, two green colors, and two blue colors are recognized from the four unit pixels on the first and second rows. Accordingly, the four unit pixels recognize only one half of the colors which four R, G and B unit pixels recognize.

In the related art personal immersive device, because the distance between the screen and the user's eyes is very short, pixel density of the color displayed on the screen is reduced.

SUMMARY

In one embodiment, a display device for virtual reality is disclosed. The display device comprises a first display panel for displaying an image for a left eye and a second display panel for displaying an image for a right eye. The first display panel comprises a first pixel row having a first end and a second end that is closer to the second display panel than the first end. The first pixel row has a first arrangement of unit pixels that alternate between a first unit pixel type and a second unit pixel type. The first unit pixel type comprises subpixels of a first color and a second color but not a third color, and the second unit pixel type comprises subpixels of the third color and the second color but not the first color. The second display panel comprises a second pixel row aligned with the first pixel row and having a third end and a fourth end that is further from the first display panel than the third end. The second pixel row has a second arrangement of unit pixels that alternate between the second unit pixel type and the first unit pixel type. A first unit pixel at the first end of the first pixel row is the first unit pixel type, and a second unit pixel at the third end of the second pixel row is the second unit pixel type.

In one embodiment, the first unit pixel type comprises subpixels of a red color and a blue color but not a green color, and the second unit pixel type comprises subpixels of the green color and the blue color but not the red color. In one embodiment, the first unit pixel type comprises subpixels of a red color and a green color but not a blue color, and the second unit pixel type comprises subpixels of the blue color and the green color but not the red color. In one embodiment, the first unit pixel type comprises subpixels of a green color and a red color but not a blue color, and the second unit pixel type comprises subpixels of the blue color and the red color but not the green color.

In one embodiment, the first display panel comprises a third pixel row having the second arrangement of unit pixels, the third pixel row having a third unit pixel of the second unit pixel type. The third unit pixel is in a same pixel column as the first unit pixel of the first pixel row. The second display panel comprises a fourth pixel row having the first arrangement of unit pixels, the fourth pixel row having a fourth unit pixel of the first unit pixel type. The fourth unit pixel is in a same pixel column as the second unit pixel of the second pixel row.

In another embodiment, a display device for virtual reality is disclosed. The display device comprises a first display panel for displaying an image for a left eye and a second display panel for displaying an image for a right eye. The first display panel and the second display panel both have a mix of unit pixels that include a first unit pixel type and a second unit pixel type. The first unit pixel type comprises subpixels of a first color and a second color but not a third color, and the second unit pixel type comprises subpixels of the third color and the second color but not the first color. The first display panel comprises a first pixel row having a first end and a second end that is closer to the second display panel than the first end. The second display panel comprises a second pixel row aligned with the first pixel row and having a third end and a fourth end that is further from the first display panel than the third end. A first unit pixel at the first end of the first pixel row is the first unit pixel type, and a second unit pixel at the third end of the second pixel row is the second unit pixel type.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

Figure 1:
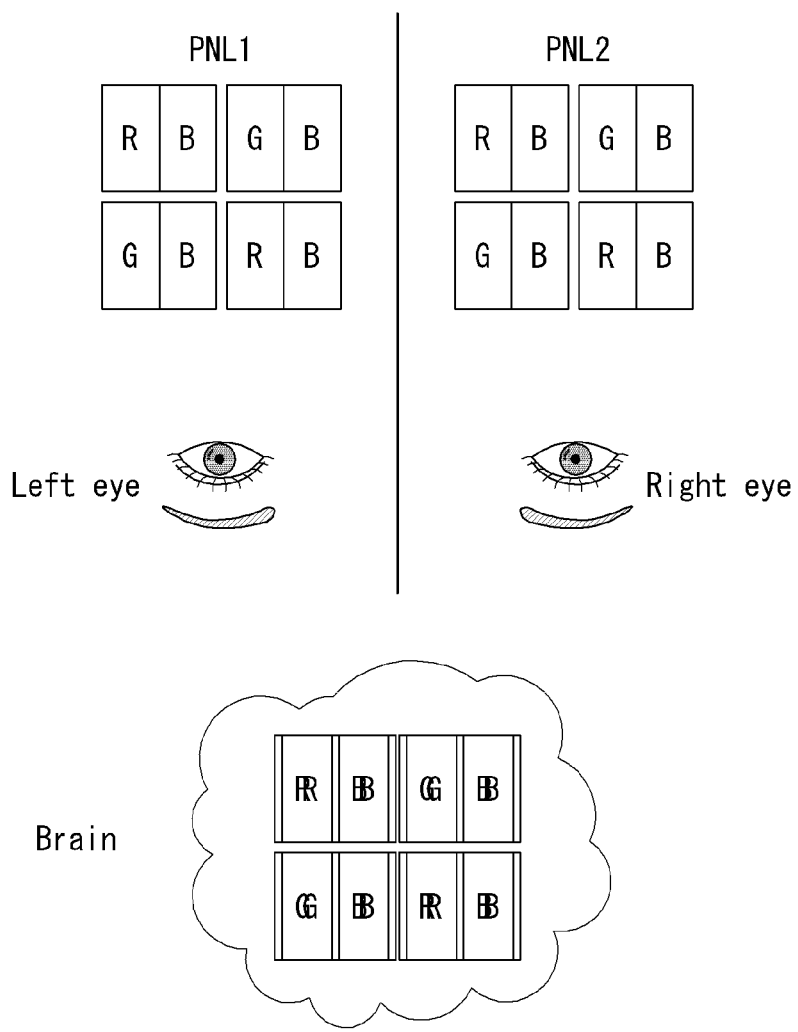
FIG. 1 illustrates a problem of a pixel array applied to a related art personal immersive device.
Figure 2:
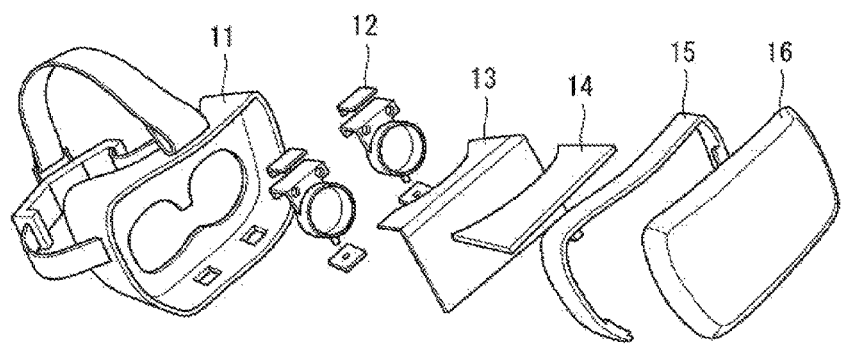
FIG. 2 is an exploded perspective view showing a personal immersive device according to an exemplary embodiment of the invention.

Referring to FIG. 2, a personal immersive device according to an exemplary embodiment of the invention includes a lens module 12, a display module 13, a main board 14, a headgear 11, a side frame 15, a front cover 16, and the like.

The display module 13 includes a display panel driving circuit for driving each of two display panels and displays an input image received from the main board 14. The display panels include a first display panel a user watches with his or her left eye and a second display panel the user watches with his/her right eye. The display module 13 displays image data received from the main board 14 on the display panels. The image data may be two-dimensional (2D) or three-dimensional (3D) image data implementing virtual reality (VR) video images or augmented reality (AR) video images. The display module 13 may display various information received from the main board 14 as texts, symbols, etc.

The lens module 12 includes extreme-wide-angle lenses (i.e., a pair of fisheye lenses) for widening an angle of view between the user's left and right eyes. The pair of fisheye lenses include a left eye lens disposed in front of the first display panel and a right eye lens disposed in front of the second display panel.

The main board 14 includes a processor that executes virtual reality software and supplies a left eye image and a right eye image to the display module 13. The main board 14 further includes an interface module connected to an external device, a sensor module, and the like. The interface module is connected to the external device through an interface such as universal serial bus (USB) and high definition multimedia interface (HDMI). The sensor module includes a gyro sensor, an acceleration sensor, and the like. The processor of the main board 14 corrects left eye image data and right eye image data in response to an output signal of the sensor module and transmits left eye image data and right eye image data of an input image received through the interface module to the display module 13. The processor of the main board 14 may produce a left eye image and a right eye image suitable for a resolution of the display panel based on the result of an analysis of depth information of a 2D image and may transmit the left eye image and the right eye image to the display module 13.

The headgear 11 includes a back cover exposing the fisheye lenses and a band connected to the back cover. The back cover of the headgear 11, the side frame 15, and the front cover 16 are assembled to secure an inner space, in which components of the personal immersive device are disposed, and to protect the components. The components include the lens module 12, the display module 13, and the main board 14. The band is connected to the back cover. The user wears the personal immersive device on his/her head using the band. When the user wears the personal immersive device on his/her head, he/she watches the different display panels (i.e., the first and second display panels) with his/her left and light eyes through the fisheye lenses.

The side frame 15 is fixed between the headgear 11 and the front cover 16 and secures a gap of the inner space, in which the lens module 12, the display module 13, and the main board 14 are disposed. The front cover 16 is disposed at a front surface of the personal immersive device.

The personal immersive device according to the embodiment of the invention may be implemented as a head mounted display (HMD) shown in FIG. 2, but is not limited to FIG. 2. For example, the embodiment of the invention may be implemented as an eye glasses-type display (EGD).

Figure 3:
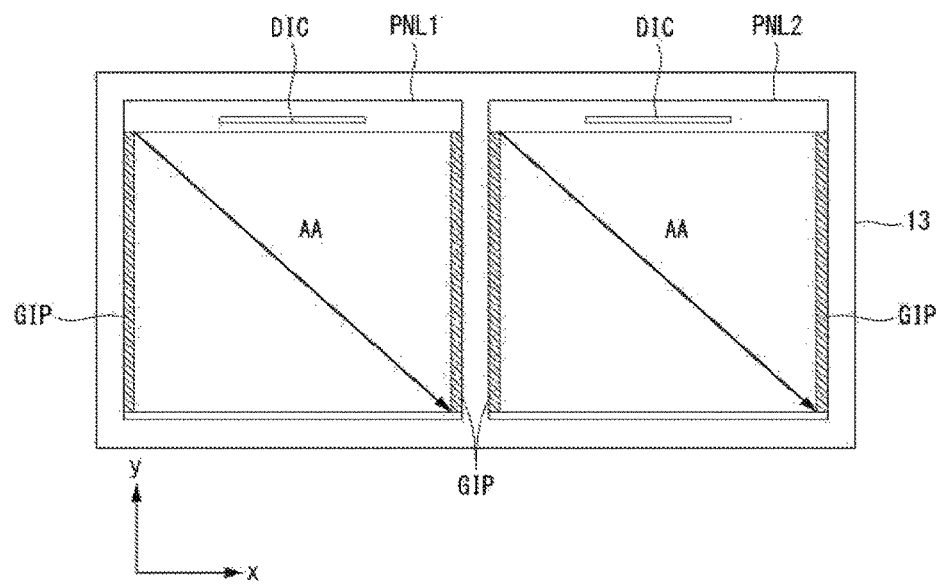
FIG. 3 shows first and second display panels of a display module shown in FIG. 2.
Figure 4:
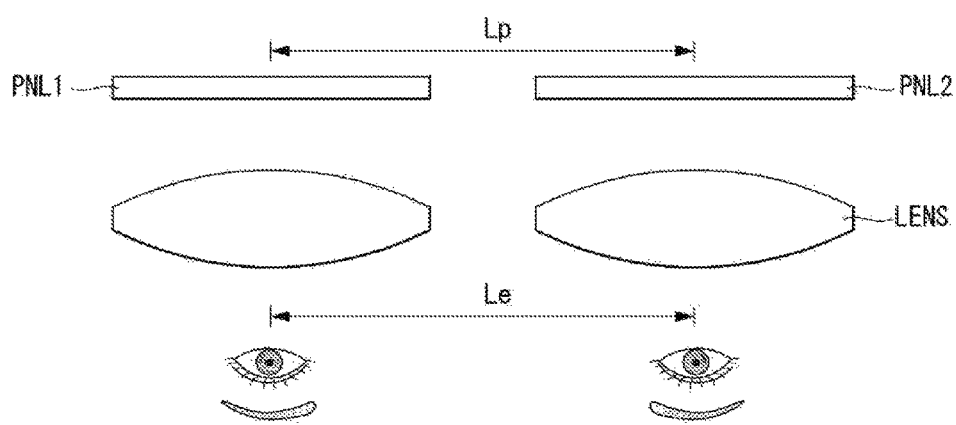
FIG. 4 illustrates a distance between first and second display panels shown in FIG. 3.

FIG. 3 shows first and second display panels PNL1 and PNL2 of the display module 13 shown in FIG. 2. FIG. 4 illustrates a distance between the first and second display panels PNL1 and PNL2 shown in FIG. 3. Each of the first and second display panels PNL1 and PNL2 is implemented as an organic light emitting diode (OLED) display panel having a fast response time, excellent color reproduction characteristic, and excellent viewing angle characteristic. In case of the EGD, the first and second display panels PNL1 and PNL2 may be implemented as a transparent OLED display panel.

Figure 6:
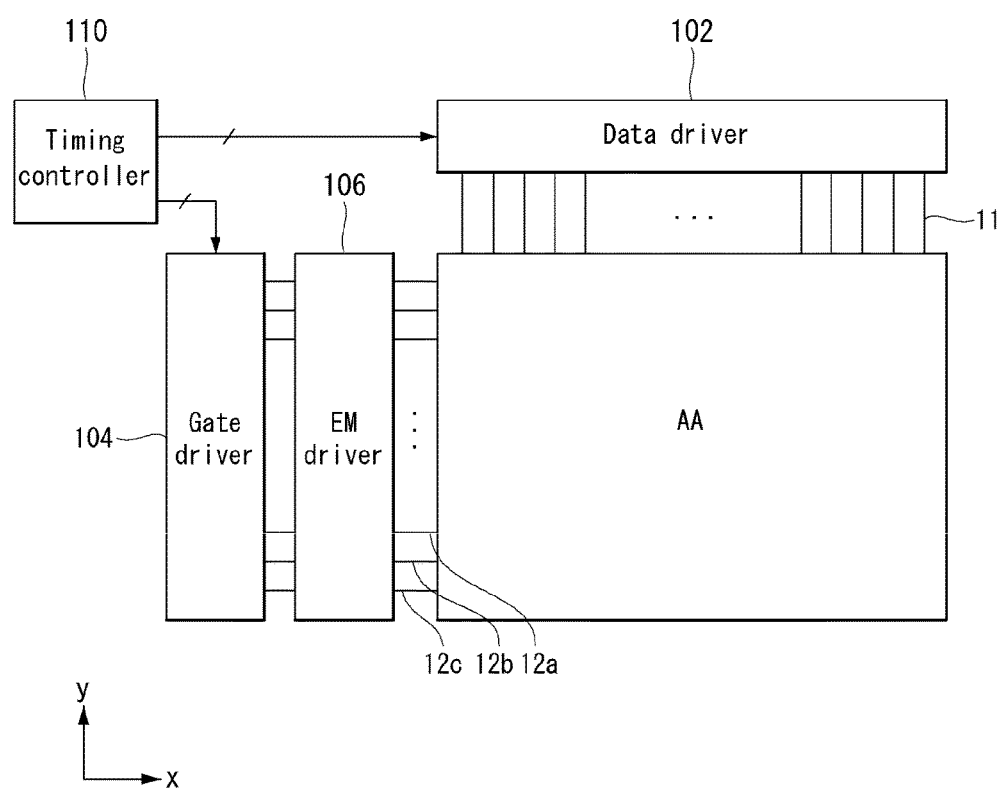
FIG. 6 is a block diagram showing configuration of a display panel shown in FIG. 3.

Referring to FIGS. 3 and 4, the first and second display panels PNL1 and PNL2 are separately manufactured and are disposed to be separated from each other on the display module 13. At least a portion of the display panel driving circuit may be disposed between the first and second display panels PNL1 and PNL2. In FIG. 3, "DIC (drive integrated circuit)" is an integrated circuit (IC) chip, into which a timing controller 110 and a data driver 102 shown in FIG. 6 are integrated. GIP (gate-in panel)" is a circuit, into which a gate driver 104 and an emission (abbreviated to "EM") driver 106 shown in FIG. 6 and a pixel array are integrated on the same substrate.

A distance Lp between a center of a pixel array AA of the first display panel PNL1 and a center of a pixel array AA of the second display panel PNL2 may be substantially the same as a distance Le between both eyes of the user. The distance Lp between the center of the pixel array AA of the first display panel PNL1 and the center of the pixel array AA of the second display panel PNL2 may be set to Le±α. The distance Le between both eyes of the user is a distance between a pupil of the left eye and a pupil of the right eye and is about 6.5 cm. The distance Le may slightly vary depending on a difference between individuals. "α" is a margin designed in consideration of the display panel driving circuit (for example, GIP of FIG. 2) disposed between the first and second display panels PNL1 and PNL2, a process deviation, etc. and may be set to 10% of Le.

The pixel array AA of each of the first and second display panels PNL1 and PNL2 has a landscape type aspect ratio, in which a length in a horizontal direction x is longer than a length in a vertical direction y, in consideration of a vertical viewing angle and a horizontal viewing angle. In the personal immersive device, an improvement effect of the viewing angle when increasing the horizontal viewing angle is greater than an improvement effect of the viewing angle when increasing the vertical viewing angle. The embodiment of the invention manufactures each of the first and second display panels PNL1 and PNL2 as a landscape type OLED display panel, so as to maximize the horizontal viewing angle in the personal immersive device.

In the landscape type aspect ratio, the number of pixels in the horizontal direction x is more than the number of pixels in the vertical direction y, and the length in the horizontal direction x is longer than the length in the vertical direction y. Further, in a portrait type aspect ratio, the number of pixels in the vertical direction y is more than the number of pixels in the horizontal direction x, and a length in the vertical direction y is longer than a length in the horizontal direction x.

The present inventors conducted an experiment on a stereoscopic feeling, an immersion, and a fatigue the user feels while changing types of the display panel of the personal immersive device. According to the result of the experiment, as shown in FIG. 4, when the pixel arrays of the first and second display panels PNL1 and PNL2 were separated from each other by the distance between both eyes of the user, the present inventors confirmed that the stereoscopic feeling the user feels was greatly improved. When the pixel arrays of the first and second display panels PNL1 and PNL2 are separated from each other and the distance between the centers of the pixel arrays of the first and second display panels PNL1 and PNL2 is the same as the distance between the left eye and the right eye of the user, the viewing angle widens and a large improvement effect of the stereoscopic feeling is obtained. Further, the stereoscopic feeling the user feels is better in the landscape type aspect ratio than the portrait type aspect ratio. The embodiment of the invention can improve the stereoscopic feeling by separately disposing a landscape type display panel for left eye and a landscape type display panel for right eye at the personal immersive device.

The first and second display panels PNL1 and PNL2 may be separately manufactured on the substrates and may be separately disposed on the display module 13. In another embodiment, the first and second display panels PNL1 and PNL2 may be separated pixel arrays AA on the same substrate, respectively. In this instance, the first display panel PNL1 may indicate the first pixel array AA, on which the left eye image is displayed, and the second display panel PNL2 may indicate the second pixel array AA, on which the right eye image is displayed.

In the personal immersive device, the fisheye lens exists between the user's eye and the display panel, and a distance between the user's eye and the display panel is as short as several centimeters. When the user watches an image reproduced on the display panels PNL1 and PNL2 through the fisheye lenses, the user watches an image which is four to five times larger than the size of a real screen displayed on the display panels PNL1 and PNL2. When a resolution of the display panel is low and used in an environment in which proximity between the user's eye and the image and the fisheye lens are applied, a non-emission area of the pixels increases. Hence, a screen door effect increases, and the immersion is reduced. The pixel array of each of the first and second display panels PNL1 and PNL2 has a resolution equal to or greater than QHD (quad high definition) resolution (1440□1280), a pixel density equal to or greater than 500 ppi (pixels per inch), and a pixel aperture ratio equal to or greater than 14%, so as to increase the immersion of the personal immersive device. In the QHD resolution 1440□1280, "1440" is the number of pixels of the pixel array in the horizontal direction x, and "1280" is the number of pixels of the pixel array in the vertical direction y. The pixel array AA may have the pixel density of 500 ppi to 600 ppi and the pixel aperture ratio of 14% to 20%, considering a technology level of the producible OLED display panels.

When the personal immersive device displays a 3D motion picture, an increase in a total latency may lead to screen retention or motion blur. The screen retention or the motion blur of the 3D motion picture reduces the quality of the 3D motion picture and also increases a fatigue of the user. The total latency is time adding a system processing time required to process data through the main board 14 and transmit the data to the display module 13 to a delay time of the display module 13. The delay time of the display module 13 is time adding a frame delay time, at which an input image is delayed during one frame period, to a response time of the pixels.

The embodiment of the invention reduces the fatigue of the user by reducing the response time of the pixels and increasing a frame rate (or a refresh rate) when the personal immersive device displays the 3D motion picture. To this end, the embodiment of the invention manufactures switching elements and driving elements of the pixels of each of the display panels PNL1 and PNL2 as an n-type metal oxide semiconductor field effect transistor (MOSFET). Hence, the embodiment of the invention reduces a response time of a pixel circuit within 2 msec and increases the frame rate to a value equal to or greater than 90 Hz, shortening a data update cycle. When the frame rate is 90 Hz, the data update cycle (i.e., one frame period) is approximately 11.1 msec. Thus, the embodiment of the invention reduces the delay time of the display module 13 of the personal immersive device to about 13 msec and can reduce the total latency to a level equal to or less than 25 msec. Data of the input image is addressed to the pixels through the data update cycle.

Figure 5:
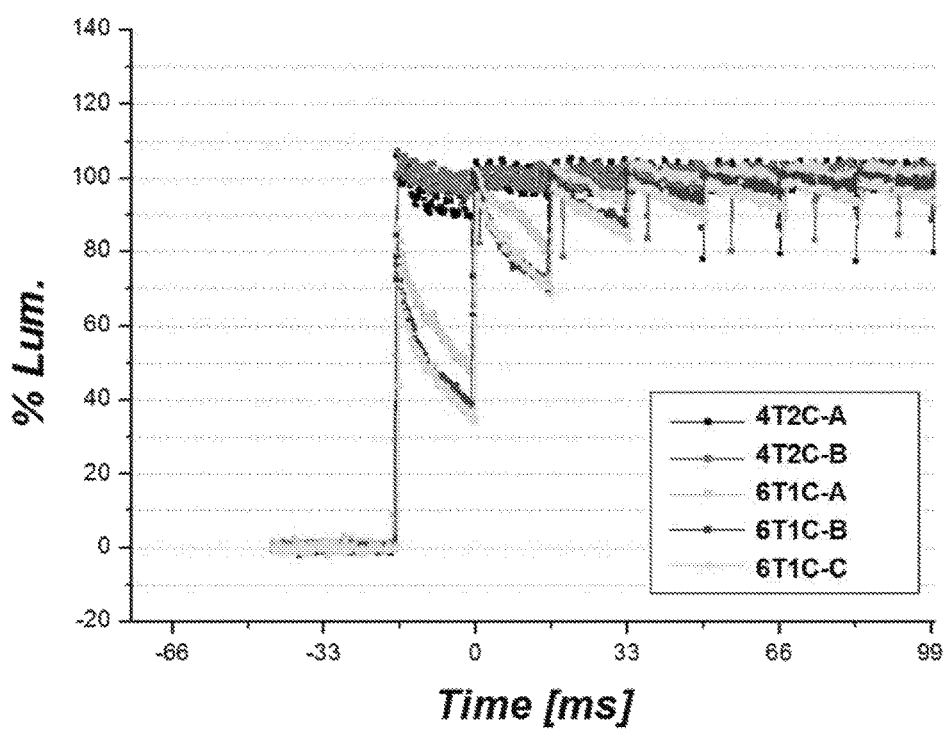
FIG. 5 is a graph showing a response time of an n-type metal oxide semiconductor field effect transistor (MOSFET) and a response time of a p-type MOSFET.

FIG. 5 is a graph showing a response time of an n-type MOSFET and a response time of a p-type MOSFET. In FIG. 5, "4T2C" indicates a response time of a pixel circuit (refer to FIG. 8) including four n-type MOSFETs and two capacitors, and "6T1C" indicates a response time of a pixel circuit (not shown) including six n-type MOSFETs and one capacitor. Further, in FIG. 5, A, B, and C are characters used to distinguish applied models.

Referring to FIG. 5, the pixel circuit using the n-type MOSFET rapidly increases a luminance of the pixel to a luminance equal to or greater than 90% of a target luminance within 2 msec at a frame rate of 60 Hz. Thus, the pixel circuit using the n-type MOSFETs has a response time within 2 msec which is much shorter than one frame period (about 16.67 msec). On the other hand, the pixel circuit using p-type MOSFETs may rise a luminance of the pixel to a luminance equal to or greater than 90% of a target luminance at a frame rate of 60 Hz after three frame periods (about (16.67×3) msec) passed. Therefore, a response time is equal to or greater than three frame periods.

The embodiment of the invention duty-drives each of the display panels PNL1 and PNL2 and controls a duty ratio of the pixels to a value equal to or less than 50% when the personal immersive device displays the 3D motion picture. Hence, the embodiment of the invention can further reduce the fatigue of the user using a black data insertion (BDI) effect. The duty ratio of the pixels is a percentage of an emission time of the pixels with respect to a given emission time. For example, the fact that the pixels emit light at a duty ratio equal to or less than 50% when a given emission time is one frame period means that the pixels emit light for time equal to or less than one half of one frame period. The duty-drive of the pixels can obtain an improvement of the motion blur and a reduction in an image persistence time using the BDI effect and can prevent the image retention and a flicker. Further, the duty-drive of the pixels can reduce the fatigue of the user watching the 3D motion picture by reducing an amount of current of the pixel at a low gray level.

Figure 7:
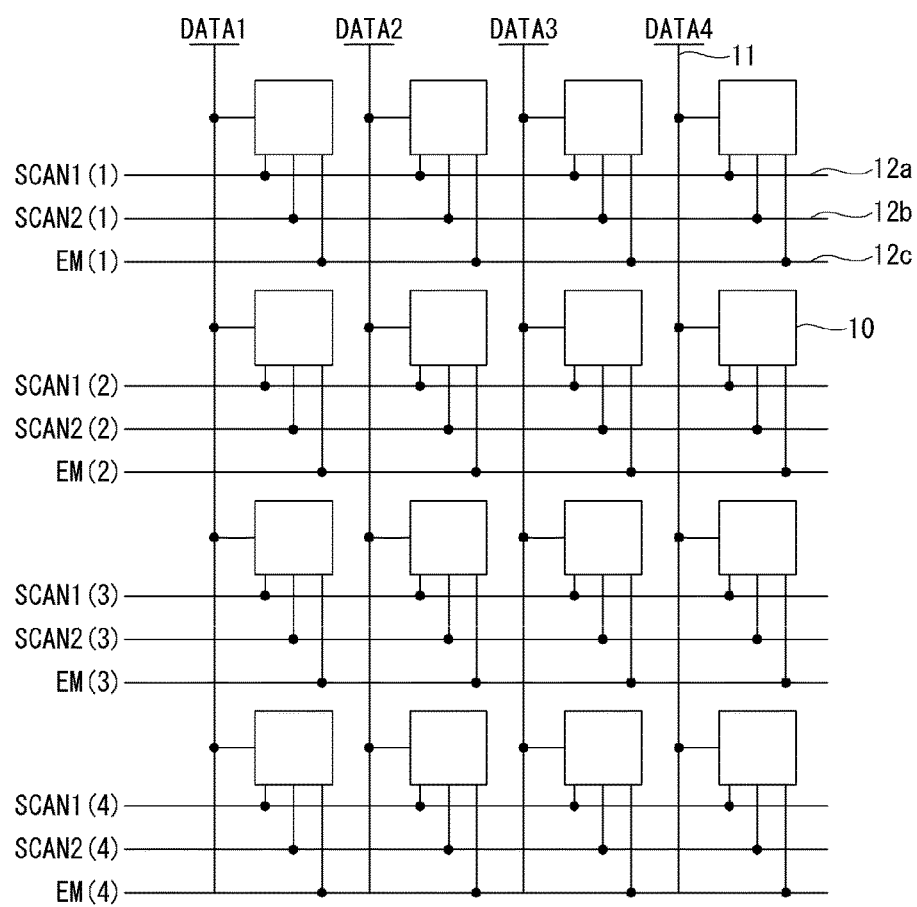
FIG. 7 schematically illustrates a portion of a pixel array shown in FIG. 6.
Figure 8:
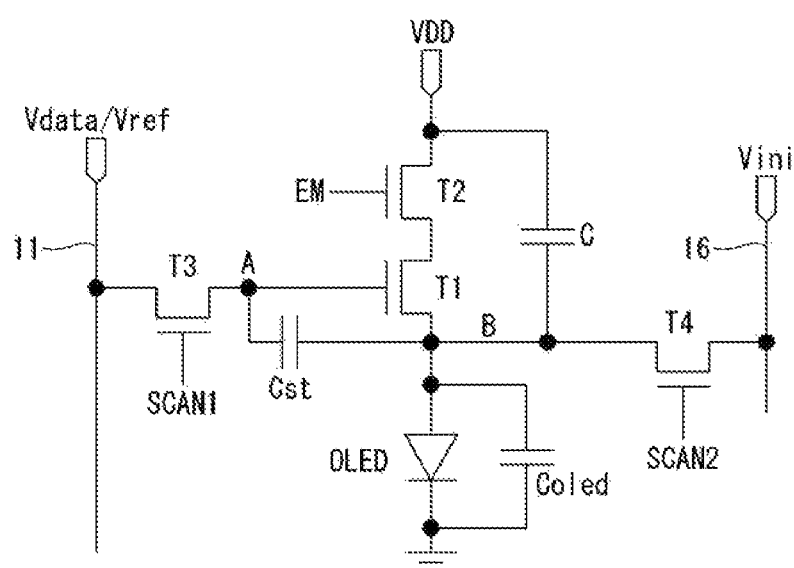
FIG. 8 is an equivalent circuit diagram showing an example of a pixel circuit.
Figure 9:
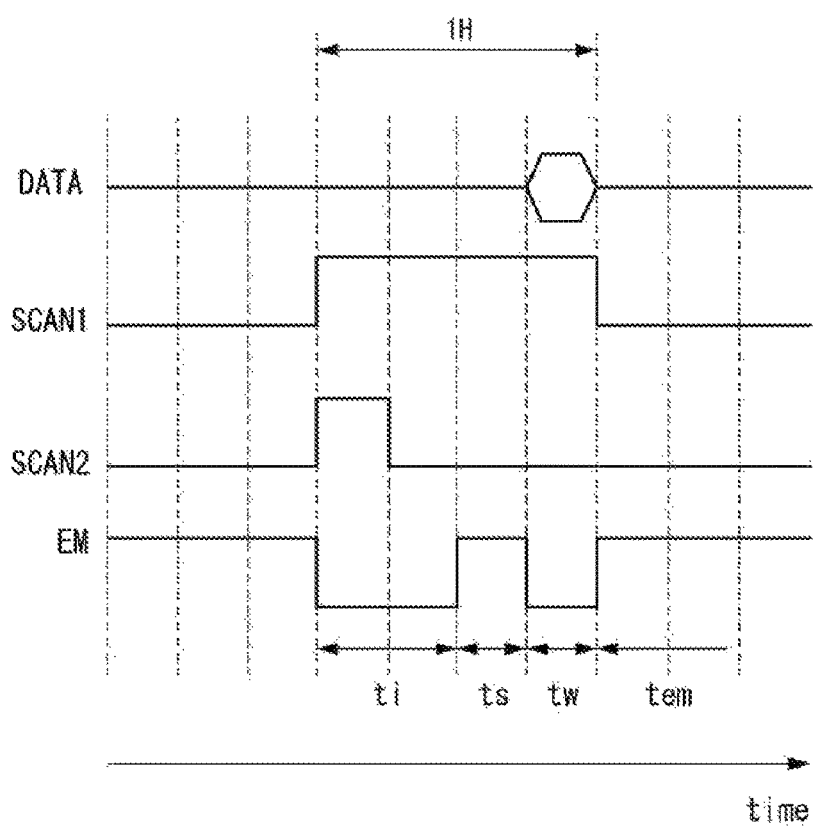
FIG. 9 is a waveform diagram illustrating signals input to a pixel shown in FIG. 8.

FIG. 6 is a block diagram showing configuration of the display panel shown in FIG. 3. FIG. 7 schematically illustrates a portion of a pixel array shown in FIG. 6. FIG. 8 is an equivalent circuit diagram showing an example of a pixel circuit. FIG. 9 is a waveform diagram illustrating signals input to a pixel shown in FIG. 8.

Referring to FIGS. 6 to 9, each of the first and second display panels PNL1 and PNL2 according to the embodiment of the invention includes the pixel array AA displaying an input image and the display panel driving circuit for writing data of the input image on the pixel array AA. The display panel driving circuit includes a data driver 102, a gate driver 104, an (abbreviated to "EM") driver 106, and a timing controller 110. The display panel driving circuit further includes a power circuit (not shown). The power circuit generates electric power required to drive the data driver 102, the gate driver 104, the EM driver 106, the timing controller 110, and the display panels PNL1 and PNL2. The first and second display panels PNL1 and PNL2 may share at least a portion (for example, the timing controller 110 of FIG. 6) of the display panel driving circuit with each other. The display panel driving circuit addresses data to pixels 10 of the display panels PNL1 and PNL2 at a high frame rate equal to or greater than 90 Hz and writes the data on the pixels 10.

A plurality of data lines 11 and a plurality of gate lines 12a, 12b, and 12c cross each other on the pixel array AA, and the pixels 10 are arranged in a matrix form. The pixel array AA includes a reference voltage line (hereinafter referred to as "REF line") 16 commonly connected to the pixels 10 and a VDD line (not shown) used to supply a high potential driving voltage VDD to the pixels 10. A predetermined initialization voltage Vini may be supplied to the pixels 10 through the REF line 16.

The gate lines 12a, 12b, and 12c include a plurality of first scan lines 12a supplied with a first scan pulse SCAN1, a plurality of second scan lines 12b supplied with a second scan pulse SCAN2, and a plurality of EM signal lines 12c supplied with an EM signal EM.

Each pixel 10 includes a red subpixel, a green subpixel, and a blue subpixel for color representation. Each pixel 10 may further include a white subpixel. One data line 11, the gate lines 12a, 12b, and 12c, the REF line 16, the VDD line, etc. are connected to each pixel 10.

One frame period is divided into a scanning period, in which data is addressed to the pixels 10 and data of the input image is written on each pixel 10, and a duty driving period, in which the pixels 10 emit light at a predetermined duty ratio in response to the AC EM signal EM after the scanning period. The AC EM signal EM is generated at a duty ratio equal to or less than 50% during the duty driving period and causes the pixels 10 to emit light at the duty ratio equal to or less than 50%. Because the scanning period is about one horizontal period, the duty driving period occupies most of one frame period. Capacitors of the pixels 10 are charged with a data voltage during the scanning period. The pixels 10 repeatedly perform an emission operation (or a turn-on operation) and a non-emission operation (or a turn-off operation) in response to the AC EM signal EM. Each pixel 10 repeatedly performs the turn-on operation and the turn-off operation during one frame period and emits light at the duty ratio equal to or less than 50%. The pixels 10 are turned off and then emit light using the data voltage charged to the capacitors. Therefore, during the duty driving period following the scanning period, the pixels 10 are not additionally supplied with the data voltage and are driven at the duty ratio equal to or less than 50%. Hence, data is displayed at the same luminance during one frame period.

The data driver 102 converts data DATA of the input image received from the timing controller 110 into a gamma compensation voltage under the control of the timing controller 110 and generates the data voltage. The data driver 102 outputs the data voltage to the data lines 11. The data driver 102 may output a predetermined reference voltage Vref to the data lines 11 during an initialization period ti, so as to initialize the driving elements of the pixels 10.

The gate driver 104 supplies the first and second scan pulses SCAN1 and SCAN2 to the first and second scan lines 12a and 12b under the control of the timing controller 110. The first and second scan pulses SCAN1 and SCAN2 are synchronized with the data voltage. When the data voltage is supplied to the pixels, the first scan pulse SCAN1 maintains an on-level and turns on a switching element T3, thereby selecting the pixels 10 to be charged with the data voltage. The second scan pulse SCAN2 rises at the same time as the first scan pulse SCAN1 and falls earlier than the first scan pulse SCAN1, thereby initializing the pixels 10 during the initialization period ti. The second scan pulse SCAN2 rises at the same time as the first scan pulse SCAN1 and falls before a sampling period ts.

The gate driver 104 shifts the scan pulses SCAN1 and SCAN2 using a shift register and sequentially supplies the scan pulses SCAN1 and SCAN2 to the scan lines 12a and 12b. The shift register of the gate driver 104 may be directly formed on the substrate of the display panel along with the pixel array AA through a gate-in panel (GIP) process.

The EM driver 106 is a duty driver that outputs the EM signal EM under the control of the timing controller 110 and supplies the EM signal EM to the EM signal lines 12c. The EM driver 106 shifts the EM signal EM using a shift register and sequentially supplies the EM signal EM to the EM signal lines 12c. The EM driver 106 repeatedly toggles the EM signal EM during the duty driving period under the control of the timing controller 110 and drives the pixels 10 at a duty ratio equal to or less than 50%. The shift register of the EM driver 106 may be directly formed on the substrate of the display panel along with the pixel array AA through the GIP process.

The timing controller 110 receives digital video data DATA of the left eye image and the right eye image received from the main board 14 and a timing signal synchronized with the digital video data DATA. The timing signal includes a vertical sync signal Vsync, a horizontal sync signal Hsync, a clock signal CLK and a data enable signal DE. The timing controller 110 generates a data timing control signal for controlling operation timing of the data driver 102, a gate timing control signal for controlling operation timing of the gate driver 104, and a duty timing control signal for controlling operation timing of the EM driver 106 based on the timing signal received from the main board 14 and a predetermined register setting value. The timing controller 110 controls a duty ratio of the EM signal EM using the duty timing control signal.

As shown in FIG. 8, each pixel 10 includes an OLED, a plurality of thin film transistors (TFTs) T1 to T4, and a storage capacitor Cst. A capacitor C may be connected between a drain of the second TFT T2 and a second node B. In FIG. 8, "Coled" denotes a parasitic capacitance of the OLED. The TFTs are implemented as the n-type MOSFET. During the scanning period, the pixels 10 sample a threshold voltage of the driving element T1 and are supplied with the data voltage of the input image. During a duty driving period tem, the pixels 10 emit light at a duty ratio equal to or less than 50%. The scanning period is divided into the initialization period ti, in which the pixels 10 are initialized, the sampling period ts, in which the threshold voltage of the driving element of each pixel 10 is sampled, and a programming period tw, in which the data voltage of the input image is supplied to the pixels 10.

The OLED emits light using an amount of current controlled by the first TFT T1 depending on the data voltage output from the data driver 102. A current path of the OLED is switched by the second TFT T2. The OLED includes an organic compound layer formed between an anode and a cathode. The organic compound layer may include a hole injection layer HIL, a hole transport layer HTL, an emission layer EML, an electron transport layer ETL, and an electron injection layer EIL, but is not limited thereto. The anode of the OLED is connected to the second node B, and the cathode of the OLED is connected to a VSS electrode, to which a low potential power voltage or a ground level voltage VSS is applied. "Coled" denotes a parasitic capacitance formed between the anode and the cathode of the OLED.

The first TFT T1 is a driving element adjusting a current flowing in the OLED depending on a gate-to-source voltage Vgs. The first TFT T1 includes a gate connected to a first node A, a drain connected to a source of the second TFT T2, and a source connected to the second node B.

The second TFT T2 is a switching element switching a current flowing in the OLED in response to the EM signal EM. The EM signal EM is generated at an on-level during the sampling period ts and repeats the on-level and an off-level during the duty driving period. Hence, the EM signal EM is generated at a duty ratio equal to or less than 50%. The drain of the second TFT T2 is connected to the VDD line supplied with the high potential driving voltage VDD, and the source of the second TFT T2 is connected to the drain of the first TFT T1. A gate of the second TFT T2 is connected to the EM signal line 12c and is supplied with the EM signal EM. The EM signal EM is generated at the on-level (or a high logic level) during the sampling period ts and turns on the second TFT T2. The EM signal EM is inverted to the off-level (or a low logic level) during the initialization period ti and the programming period tw and turns off the second TFT T2. The EM signal EM repeats the on-level and the off-level depending on a pulse width modulation (PWM) duty ratio and is generated at a duty ratio equal to or less than 50% during the duty driving period tem. The OLED emits light at a duty ratio equal to or less than 50% due to the second TFT T2 switching in response to the EM signal EM.

The third TFT T3 is a switching element supplying the data voltage Vdata to the first node A in response to the first scan pulse SCAN1. The third TFT T3 includes a gate connected to the first scan line 12a, a drain connected to the data line 11, and a source connected to the first node A. The first scan pulse SCAN1 is supplied to the pixels 10 through the first scan line 12a. The first scan pulse SCAN1 is generated at an on-level during about one horizontal period 1H and turns on the third TFT T3. The first scan pulse SCAN1 is inverted to an off-level during the duty driving period tem and turns off the third TFT T3.

The fourth TFT T4 is a switching element supplying the reference voltage Vref to the second node B in response to the second scan pulse SCAN2. The fourth TFT T4 includes a gate connected to the second scan line 12b, a drain connected to the REF line 16, and a source connected to the second node B. The second scan pulse SCAN2 is supplied to the pixels 10 through the second scan line 12b. The second scan pulse SCAN2 is generated at an on-level during the initialization period ti and turns on the fourth TFT T4. The second scan pulse SCAN2 maintains an off-level during the remaining period and controls the fourth TFT T4 in an Off-state.

The storage capacitor Cst is connected between the first node A and the second node B and stores a difference voltage between the first node A and the second node B, thereby holding the gate-to-source voltage Vgs of the first TFT T1. The storage capacitor Cst samples a threshold voltage Vth of the driving element, i.e., the first TFT T1 in a source follower manner. The capacitor C is connected between the VDD line and the second node B. When a voltage of the first node A changes depending on the data voltage Vdata during the programming period tw, the capacitors Cst and C divide a change amount of the voltage of the first node A and reflect the divided voltage on a voltage of the second node B.

The scanning period of the pixel 10 is divided into the initialization period ti, the sampling period ts, and the programming period tw. The scanning period is set to about one horizontal period 1H, and data is written on the pixels 10 arranged on one horizontal line of the pixel array during the scanning period. During the scanning period, the threshold voltage Vth of the driving element, i.e., the first TFT T1 of the pixel 10 is sampled, and the data voltage is compensated by an amount of the threshold voltage Vth. Thus, during one horizontal period 1H, data DATA of the input image is compensated by an amount of the threshold voltage Vth of the driving element T1 and is written on the pixel 10.

When the initialization period ti starts, the first and second scan pulses SCAN1 and SCAN2 rise and are generated at the on-level. And at the same time, the EM signal EM falls and changes to the off-level. During the initialization period ti, the second TFT T2 is turned off and blocks a current path of the OLED. During the initialization period ti, the third and fourth TFTs T3 and T4 are turned on. During the initialization period ti, the predetermined reference voltage Vref is supplied to the data line 11. During the initialization period ti, the voltage of the first node A is initialized to the reference voltage Vref, and the voltage of the second node B is initialized to the predetermined initialization voltage Vini. After the initialization period ti, the second scan pulse SCAN2 changes to the off-level and turns off the fourth TFT T4. The on-level is a level of a gate voltage of the TFT that causes the switching elements T2 to T4 of the pixel 10 to be turned on. The off-level is a level of the gate voltage of the TFT that causes the switching elements T2 to T4 of the pixel 10 to be turned off.

During the sampling period ts, the first scan pulse SCAN1 maintains the on-level, and the second scan pulse SCAN2 maintains the off-level. When the sampling period ts starts, the EM signal EM rises and changes to the on-level. During the sampling period ts, the second and third TFTs T2 and T3 are turned on. During the sampling period ts, the second TFT T2 is turned on in response to the EM signal EM of the on-level. During the sampling period ts, the third TFT T3 maintains the On-state due to the first scan pulse SCAN1 of the on-level. During the sampling period ts, the reference voltage Vref is supplied to the data line 11. During the sampling period ts, the voltage of the first node A is held at the reference voltage Vref, and the voltage of the second node B rises due to a drain-to-source current Ids. The gate-to-source voltage Vgs of the first TFT T1 is sampled as the threshold voltage Vth of the first TFT T1 through the source follower manner, and the sampled threshold voltage Vth is stored in the storage capacitor Cst. During the sampling period ts, the voltage of the first node A is the reference voltage Vref, and the voltage of the second node B is "Vref−Vth".

During the programming period tw, the third TFT T3 maintains the On-state in response to the first scan pulse SCAN1 of the on-level, and the remaining TFTs T1, T2, and T4 are turned off. During the programming period tw, the data voltage Vdata of the input image is supplied to the data line 11. The data voltage Vdata is applied to the first node A, and the result of voltage division between the capacitors Cst and C with respect to a change amount (Vdata−Vref) of the voltage of the first node A is reflected on the voltage of the second node B. Hence, the gate-to-source voltage Vgs of the first TFT T1 is programmed. During the programming period tw, the voltage of the first node A is the data voltage Vdata, and the voltage of the second node B is "Vref−Vth+C'*(Vdata−Vref)" obtained by adding the result (C'*(Vdata−Vref)) of voltage division between the capacitors Cst and C to the voltage "Vref−Vth" set through the sampling period ts. As a result, the gate-to-source voltage Vgs of the first TFT T1 is programmed to "Vdata−Vref+Vth−C'*(Vdata−Vref)" through the programming period tw. In the embodiment disclosed herein, C' is Cst/(Cst+C).

When the duty driving period tem starts, the EM signal EM rises and again changes to the on-level. On the other hand, the first scan pulse SCAN1 falls and changes to the off-level. During the duty driving period tem, the second TFT T2 maintains the On-state and forms a current path of the OLED. During the duty driving period tem, the first TFT T1 controls an amount of current flowing in the OLED based on the data voltage Vdata.

The duty driving period tem ranges from termination point of the programming period tw to a start point of the initialization period ti of a next frame period. The embodiment of the invention causes the pixels 10 not to successively emit light during the duty driving period tem and causes the pixels 10 to emit light at a duty ratio equal to or less than 50% through the switching of the EM signal EM. When the EM signal EM is generated at the on-level, the second TFT T2 is turned on and forms the current path of the OLED. During the duty driving period tem, a current Ioled controlled based on the gate-to-source voltage Vgs of the first TFT T1 flows in the OLED and causes the OLED to emit light. During the duty driving period tem, because the first and second scan pulses SCAN1 and SCAN2 maintain the off-level, the third and fourth TFTs T3 and T4 are turned off.

The current Ioled flowing in the OLED during the duty driving period tem is expressed by the following Equation 1. The OLED emits light due to the current Ioled and represents brightness of the input image.

$$I_{oled} = \frac{k}{2}[(1-C')(V_{data}-V_{ref})]^2 \qquad \text{[Equation 1]}$$

In the above Equation 1, k is a proportional constant determined by a mobility, a parasitic capacitance, a channel capacity, etc. of the first TFT T1.

Because the threshold voltage Vth of the first TFT T1 is included in the gate-to-source voltage Vgs of the first TFT T1 programmed through the programming period tw, Vth is cancelled in Ioled expressed in Equation 1. Thus, an influence of the threshold voltage Vth of the driving element, i.e., the first TFT T1 on the current Ioled of the OLED is removed.

Figure 10:
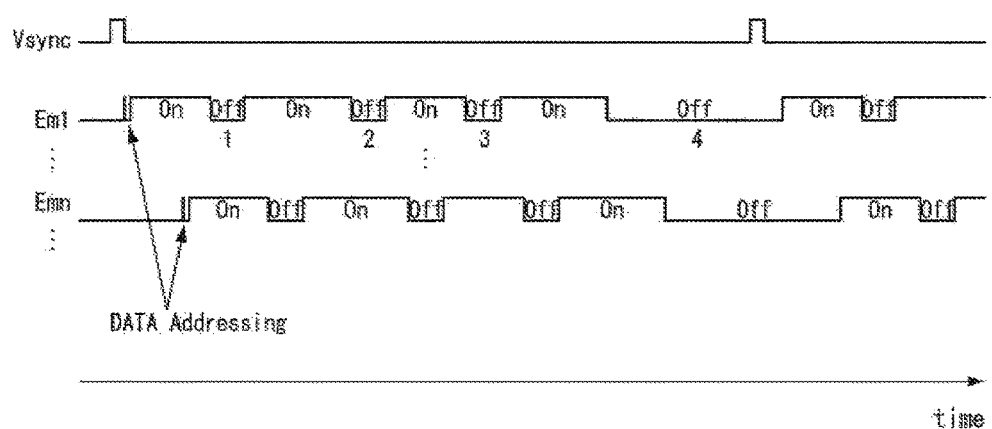
FIG. 10 is a waveform diagram illustrating a duty driving method of a pixel circuit according to an exemplary embodiment of the invention.
Figure 11:
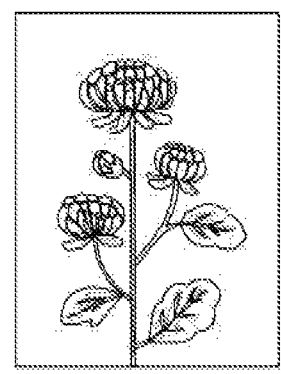
FIG. 11 illustrates a BDI effect in a duty driving method of a pixel circuit according to an exemplary embodiment of the invention.
Figure 11:
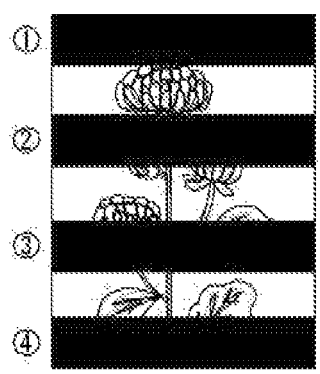
Figure 11:
Figure 11:
Figure 11:
Figure 11:
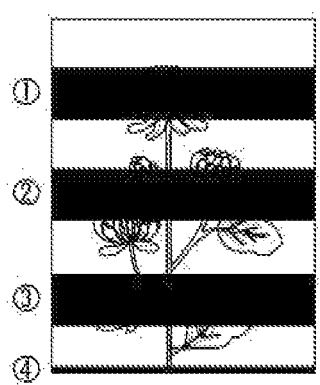
Figure 11:
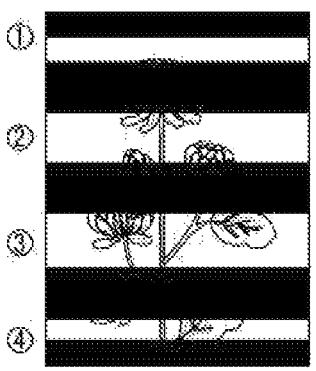
Figure 12:
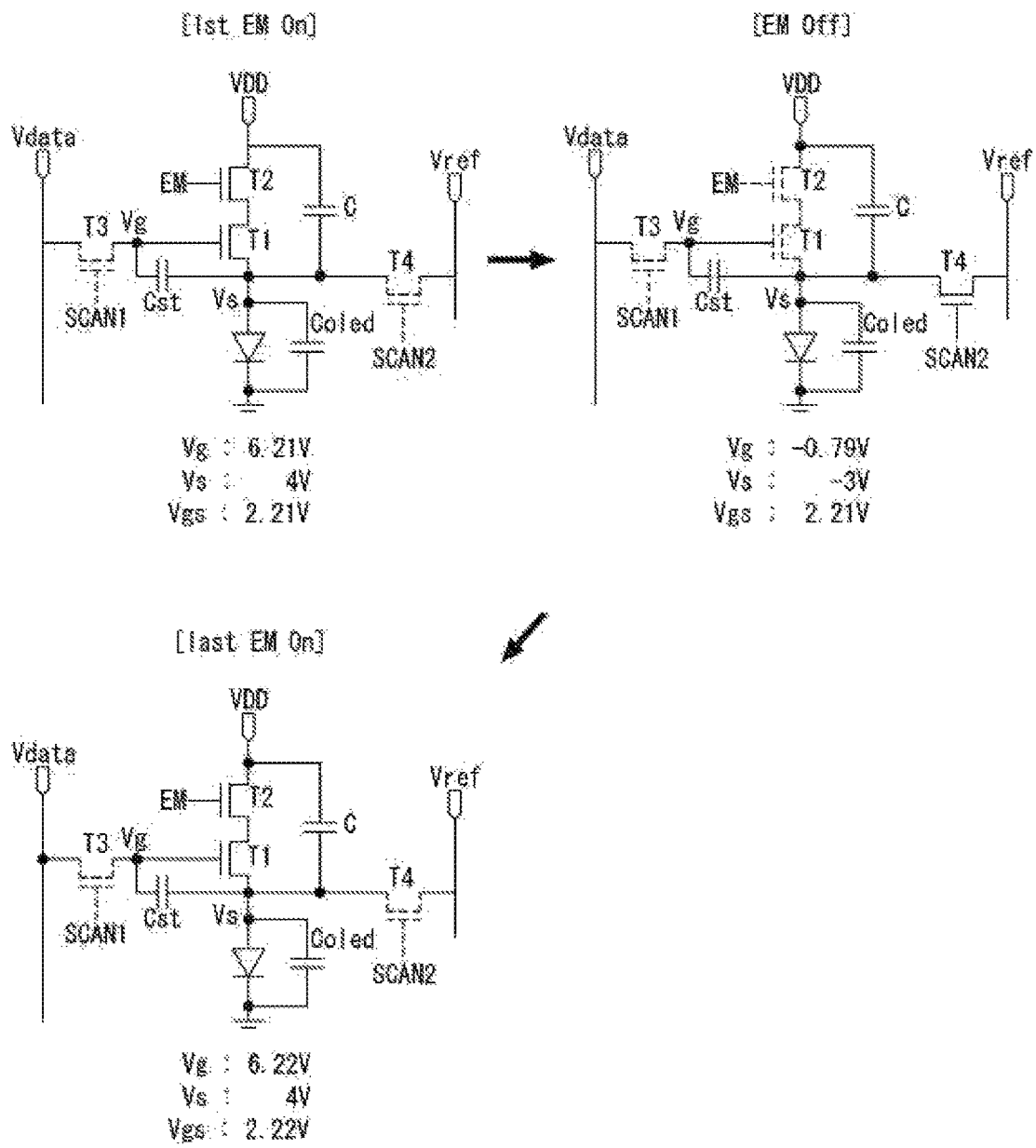
FIG. 12 illustrates a principle, in which data of a pixel is maintained during one frame period without additional data addressing.

FIG. 10 is a waveform diagram illustrating a duty driving method of a pixel circuit according to the embodiment of the invention. FIG. 11 illustrates a BDI effect in a duty driving method of a pixel circuit according to the embodiment of the invention. In FIG. 11, (a) shows an image of one frame. (b) of FIG. 11 shows an example where a non-duty driving period (i.e., turn-off period) is sequentially shifted when the same image as (a) of FIG. 11 is displayed on the pixels using the duty driving method. FIG. 12 illustrates a principle, in which data of a pixel is maintained during one frame period without additional data addressing.

Referring to FIGS. 10 and 11, the vertical sync signal Vsync is a timing signal defining one frame period. During one frame period, image data corresponding to an amount of one frame is addressed to the pixels 10 and is written on the pixels 10.

Only during an initial scanning period of one frame period, data of an input image is addressed to the pixels 10 and is written on the pixels 10. The pixels 10 are turned off in an off-level period of the EM signal EM. However, as shown in FIG. 9, the pixels 10 hold the data voltage and emit light during a turn-on period after a turn-off period at the same luminance as a turn-on period before the turn-off period.

An on-level period of the EM signal EM defines a turn-on period in the pixel array. The EM signal EM of the on-level forms the current path of the OLED in the pixels 10 and turns on the OLED. On the other hand, the off-level period of the EM signal EM defines a turn-off period in the pixel array. During the turn-off period, the EM signal EM of the off-level is applied to the pixels 10. The pixels 10 of the turn-off period display a black gray level because the current path of the OLED is blocked and the current does not flow in the OLED.

The EM signal EM has two or more cycles during the duty driving period tem of one frame period. One cycle of the EM signal EM includes one on-level period and one off-level period. Thus, the on-level periods and the off-level periods of the EM signal EM alternate with each other during the duty driving period tem, and the adjacent on-level periods are cut off with the off-level period interposed therebetween. Each pixel 10 is turned off due to the EM signal EM one or more times in the duty driving period tem. Because the off-level period of the EM signal EM is shifted along a scanning direction of the display panel, the turn-off period in the pixel array AA is shifted along the off-level period of the EM signal EM as shown in FIG. 10.

The duty driving method drives the pixels 10 at a duty ratio equal to or less than 50% and thus can improve the image retention and the flicker. In particular, the duty driving method can reduce the user's fatigue when the personal immersive device displays the 3D motion picture.

The embodiment of the invention holds the data voltage of the pixels during the duty driving period without additionally writing data on the pixels. This is described with reference to FIG. 12.

Referring to FIG. 12, after data is written on the pixels 10 through the data addressing, the first scan pulse SCAN1 maintains the off-level during one frame period. As a result, after the storage capacitor Cst is charged with the data voltage, the first node A connected to the gate of the first TFT T1 is floated. When a source voltage Vs of the first TFT T1 changes, the gate voltage Vg changes depending on a change in the source voltage Vs while charges of the storage capacitor Cst are uniformly maintained. As a result, after the pixels 10 are turned off due to the on-level period and the off-level period of the EM signal EM, the gate-to-source voltage Vgs of the driving element, i.e., the first TFT T1 may be uniformly held even if data is not again written on the pixels 10. Because the gate-to-source voltage Vgs of the driving element T1 is uniformly held as described above, the data written on the pixels 10 is maintained.

Next, the pixel arrays of the first and second display panels of the display device for the personal immersive device according to the embodiment of the invention are described.

FIGS. 13A to 15B illustrate examples of configuration of the pixel arrays of the first and second display panels of the display device for the personal immersive device according to the embodiment of the invention.

As shown in FIGS. 13A to 15B, each unit pixel of a pixel array of a first OLED display panel PNL1 of the personal immersive device according to the embodiment of the invention includes two subpixels from the following group of subpixels: a red (R) subpixel, a green (G) subpixel, and a blue (B) subpixel. Further, a first unit pixel among adjacent unit pixels includes a subpixel of the same color as any one of subpixels included in a second unit pixel adjacent to the first unit pixel and a subpixel of a color not included in the second unit pixel. Each unit pixel of a pixel array of a second OLED display panel PNL2 includes two subpixels from the following group of subpixels: R, G, and B subpixels. The second display panel PNL2 also includes a third unit pixel corresponding to the first unit pixel of PNL1 and a fourth unit pixel corresponding to the second unit pixel of PNL1. The first unit pixel has the same subpixel arrangement as the fourth unit pixel, and the second unit pixel has the same subpixel arrangement as the third unit pixel.

According to the structures of the pixel array according to the embodiment of the invention, a color absent in a unit pixel of each of the first and second display panels is disposed in another unit pixel adjacent to the unit pixel, and a color of a unit pixel of a left eye image is different from a color of a corresponding unit pixel of a right eye image. Therefore, when the left eye image and the right eye image are combined, all of colors are represented on each unit pixel. Hence, the embodiment of the invention can increase the pixel density of the color while maintaining a resolution of the display device.

Hereinafter, configuration of the pixel arrays of the first and second display panels of the display device for the personal immersive device according to the embodiment of the invention is described in detail with reference to FIGS. 13A to 15B.

Figure 13A:
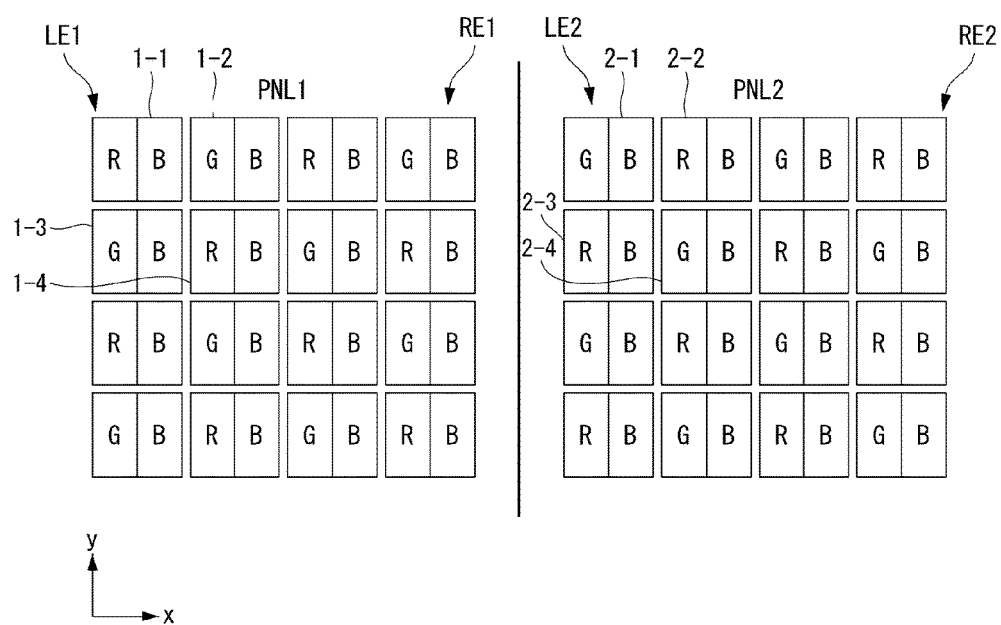
FIG. 13A shows a first example of pixel arrays of first and second display panels of a display device for a personal immersive device according to an exemplary embodiment of the invention.
Figure 13B:
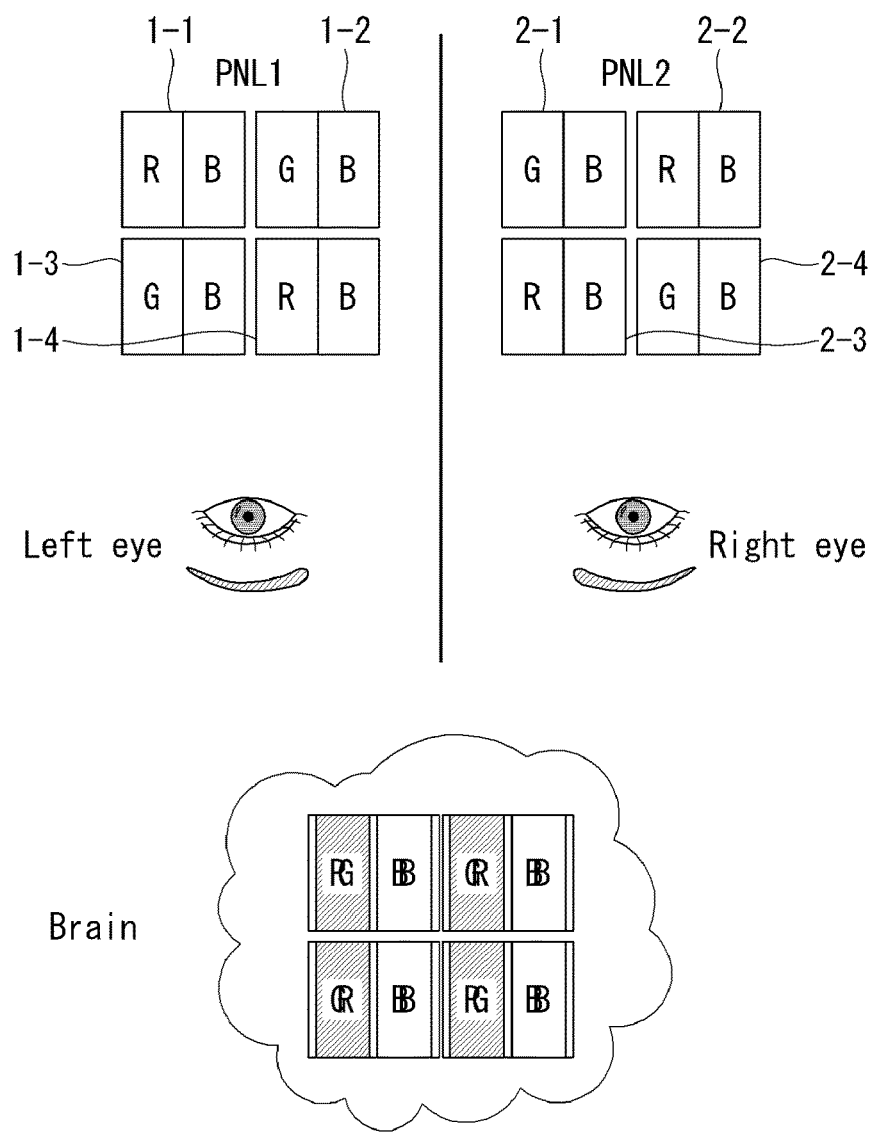
FIG. 13B illustrates an arrangement of colors obtained by combining and recognizing a left eye image and a right eye image in a brain in accordance with configuration of the pixel arrays of FIG. 13A.

FIG. 13A shows a first example of pixel arrays of the first and second display panels PNL1 and PNL2 of the display device for the personal immersive device according to the embodiment of the invention. FIG. 13B illustrates an arrangement of colors obtained by combining and recognizing a left eye image and a right eye image in a brain in accordance with configuration of the pixel array of FIG. 13A.

Referring to FIG. 13A, each pixel row of the first display panel PNL1 is aligned with a corresponding pixel row of the second display panel PNL2 in the X direction. For example, the first pixel row of the first display panel PNL1 and the first pixel row of the second display panel PNL2 are aligned with each other in the X direction. Each pixel row in the first display panel PNL1 includes a left end LE1 and a right end RE1. The right end RE1 is closer to the second display panel PNL2 than left end LE1. Each pixel row in the second display panel PNL2 includes a left end LE2 and a right end RE2. The right end RE2 is located further from first display panel PNL1 than left end LE2.

Additionally, two unit pixel types are mixed together and alternate with each other in the display panels. One type of unit pixel includes R and B subpixels but no G subpixels. Another type of unit pixel includes G and B subpixels but no R subpixels. A first row of the first display panel PNL1 repeats an arrangement where R, B, G, and B subpixels form two unit pixels. As a result, the first row of display panel PNL1 includes an alternating RB-GB unit pixel arrangement. A second row of the first display panel PNL1 repeats an arrangement where G, B, R, and B subpixels form two unit pixels. As a result, the second row of display panel PNL1 includes an alternating GB-RB unit pixel arrangement. In the first display panel PNL1, odd-numbered rows (for example, a third row) repeat the same arrangement as the first row, and even-numbered rows (for example, a fourth row) repeat the same arrangement as the second row.

Further, a first row of the second display panel PNL2 repeats an arrangement where G, B, R, and B subpixels form two unit pixels. As a result, the first row of display panel PNL2 includes the alternating GB-RB unit pixel arrangement. A second row of the second display panel PNL2 repeats an arrangement where R, B, G, and B subpixels form two unit pixels. As a result, the second row of display panel PNL2 includes the alternating RB-GB unit pixel arrangement.

Alternatively, the first row of the first display panel PNL1 may repeat an arrangement where G, B, R, and B subpixels form two unit pixels, and a second row of the first display panel PNL1 may repeat an arrangement where R, B, G, and B subpixels form two unit pixels. In the first display panel PNL1, the odd-numbered rows may repeat the same arrangement as the first row, and the even-numbered rows may repeat the same arrangement as the second row.

In this instance, the first row of the second display panel PNL2 may repeat an arrangement where R, B, G, and B subpixels form two unit pixels, and the second row of the second display panel PNL2 may repeat an arrangement where G, B, R, and B subpixels form two unit pixels.

According to the first example of the pixel array structure according to the embodiment of the invention, two adjacent unit pixels disposed on the first pixel row of the first display panel PNL1 include a 1-1 unit pixel including the R and B subpixels at the left end LE1 of the first pixel row and a 1-2 unit pixel including the G and B subpixels. Two adjacent unit pixels disposed on the second row includes a 1-3 unit pixel including the G and B subpixels, and a 1-4 unit pixel including the R and B subpixels. The 1-3 unit pixel is in a same pixel column as the 1-1 unit pixel, and the 1-4 unit pixel is in a same pixel column as the 1-2 unit pixel.

Accordingly, the green color absent in the 1-1 unit pixel can be compensated with the G subpixel disposed in the 1-2 unit pixel adjacent to the 1-1 unit pixel, and the red color absent in the 1-2 unit pixel can be compensated with the R subpixel disposed in the 1-1 unit pixel adjacent to the 1-2 unit pixel. Further, the red color absent in the 1-3 unit pixel can be compensated with the R subpixel disposed in the 1-4 unit pixel adjacent to the 1-3 unit pixel, and the green color absent in the 1-4 unit pixel can be compensated with the G subpixel disposed in the 1-3 unit pixel adjacent to the 1-4 unit pixel.

Further, two adjacent unit pixels disposed on the first row of the second display panel PNL2 include a 2-1 unit pixel including the G and B subpixels at the left end LE2 of the row and a 2-2 unit pixel including the R and B subpixels. Two adjacent unit pixels disposed on the second row includes a 2-3 unit pixel including the R and B subpixels and a 2-4 unit pixel including the G and B subpixels. The 2-3 unit pixel is in a same pixel column as the 2-1 unit pixel, and the 2-4 unit pixel is in a same pixel column as the 2-2 unit pixel.

Accordingly, the red color absent in the 2-1 unit pixel can be compensated with the R subpixel disposed in the 2-2 unit pixel adjacent to the 2-1 unit pixel, and the green color absent in the 2-2 unit pixel can be compensated with the G subpixel disposed in the 2-1 unit pixel adjacent to the 2-2 unit pixel. Further, the green color absent in the 2-3 unit pixel can be compensated with the G subpixel disposed in the 2-4 unit pixel adjacent to the 2-3 unit pixel, and the red color absent in the 2-4 unit pixel can be compensated with the R subpixel disposed in the 2-3 unit pixel adjacent to the 2-4 unit pixel.

The left eye image displayed on the first display panel PNL1 and the right eye image displayed on the second display panel PNL2 are respectively input through the left eye and the right eye and are combined in the brain. As a result, as shown in FIG. 13B, all of the unit pixels can represent the red, green, and blue colors through a combination of the 1-1 unit pixel (including the R and B subpixels) and the 2-1 unit pixel (including the G and B subpixels), a combination of the 1-2 unit pixel (including the G and B subpixels) and the 2-2 unit pixel (including the R and B subpixels), a combination of the 1-3 unit pixel (including the G and B subpixels) and the 2-3 unit pixel (including the R and B subpixels), and a combination of the 1-4 unit pixel (including the R and B subpixels) and the 2-4 unit pixel (including the G and B subpixels).

Accordingly, the first example of the pixel array structure according to the embodiment of the invention can increase the pixel density of the color while maintaining the resolution of the display device.

Figure 14A:
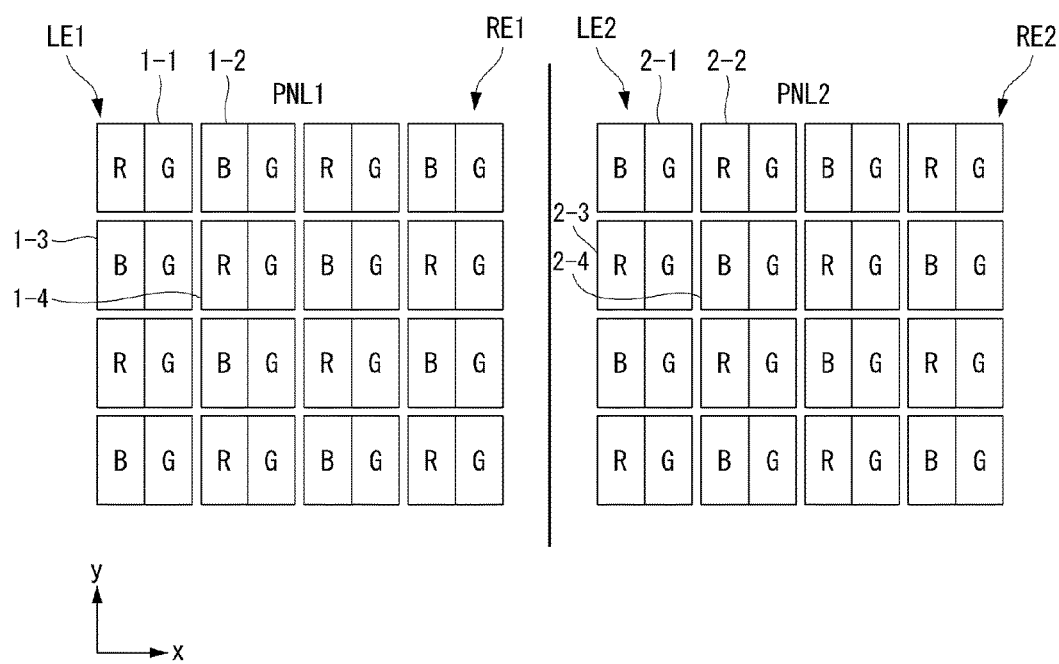
FIG. 14A shows a second example of pixel arrays of first and second display panels of a display device for a personal immersive device according to an exemplary embodiment of the invention.
Figure 14B:
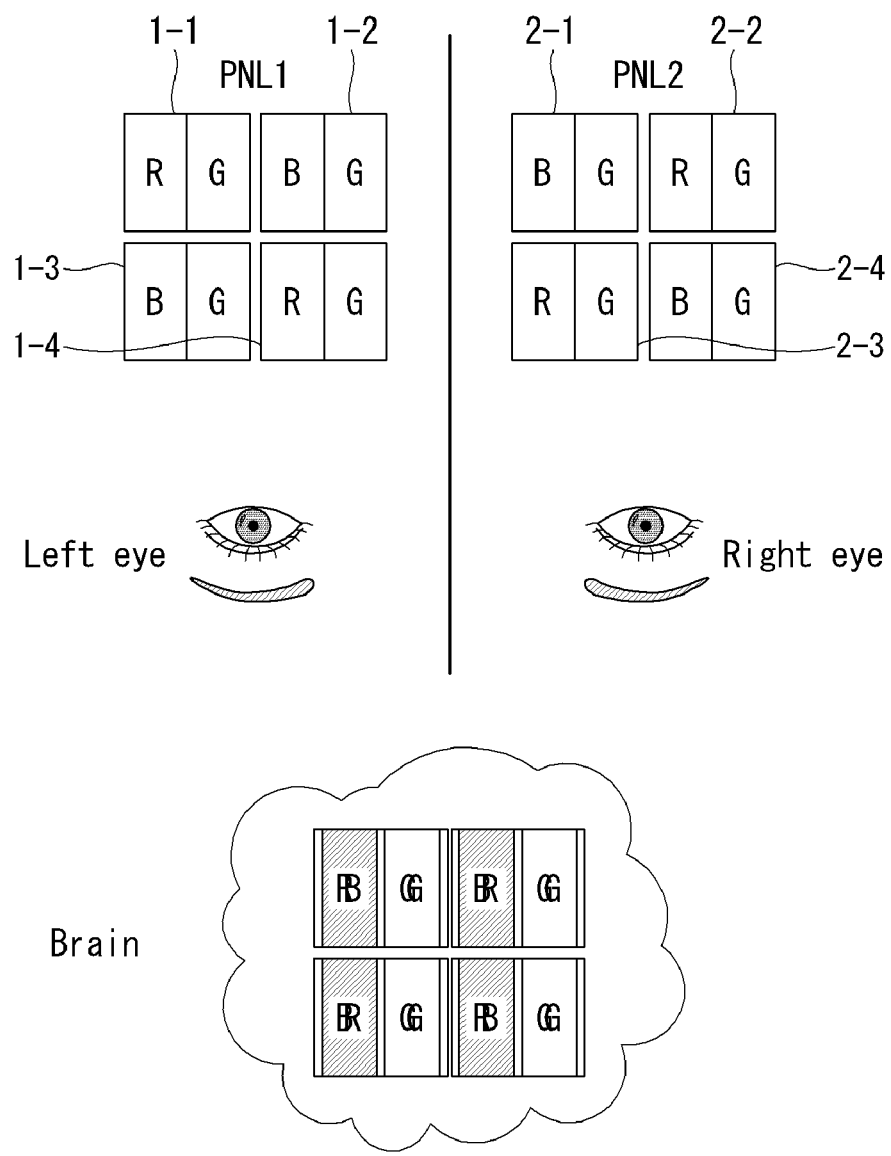
FIG. 14B illustrates an arrangement of colors obtained by combining and recognizing a left eye image and a right eye image in a brain in accordance with configuration of the pixel arrays of FIG. 14A.

FIG. 14A shows a second example of pixel arrays of the first and second display panels PNL1 and PNL2 of the display device for the personal immersive device according to the embodiment of the invention. FIG. 14B illustrates an arrangement of colors obtained by combining and recognizing a left eye image and a right eye image in a brain in accordance with configuration of the pixel array of FIG. 14A.

Referring to FIG. 14A, the pixel arrays are similar to those shown in FIG. 13A, but now include different repeating pixel arrangements. Two types of unit pixels are mixed together in the panels. One type of unit pixel includes R and G subpixels but no B subpixels. Another type of unit pixel includes B and G subpixels but no R subpixels.

A first row of the first display panel PNL1 repeats an arrangement where R, G, B, and G subpixels form two unit pixels. As a result, the first row of display panel PNL1 includes an alternating RG-BG unit pixel arrangement. A second row of the first display panel PNL1 repeats an arrangement where B, G, R, and G subpixels form two unit pixels. As a result, the second row of display panel PNL1 includes an alternating BG-RG unit pixel arrangement. In the first display panel PNL1, odd-numbered rows (for example, a third row) repeat the same arrangement as the first row, and even-numbered rows (for example, a fourth row) repeat the same arrangement as the second row.

Further, a first row of the second display panel PNL2 repeats an arrangement where B, G, R, and G subpixels form two unit pixels. As a result, the first row of display panel PNL2 includes the alternating BG-RG unit pixel arrangement. A a second row of the second display panel PNL2 repeats an arrangement where R, G, B, and G subpixels form two unit pixels. As a result, the second row of display panel PNL2 includes the alternating RG-BG pixel unit arrangement.

Alternatively, the first row of the first display panel PNL1 may repeat an arrangement where R, G, B and G subpixels form two unit pixels, and a second row of the first display panel PNL1 may repeat an arrangement where B, G, R and G subpixels form two unit pixels. In the first display panel PNL1, the odd-numbered rows may repeat the same arrangement as the first row, and the even-numbered rows may repeat the same arrangement as the second row.

In this instance, the first row of the second display panel PNL2 may repeat an arrangement where B, G, R and G subpixels form two unit pixels, and the second row of the second display panel PNL2 may repeat an arrangement where R, G, B and G subpixels form two unit pixels.

According to the second example of the pixel array structure according to the embodiment of the invention, two adjacent unit pixels disposed on the first pixel row of the first display panel PNL1 include a 1-1 unit pixel including the R and G subpixels at the left end LE1 of the first pixel row and a 1-2 unit pixel including the B and G subpixels, and two adjacent unit pixels disposed on the second row includes a 1-3 unit pixel including the B and G subpixels and a 1-4 unit pixel including the R and G subpixels.

Accordingly, the blue color absent in the 1-1 unit pixel can be compensated with the B subpixel disposed in the 1-2 unit pixel adjacent to the 1-1 unit pixel, and the red color absent in the 1-2 unit pixel can be compensated with the R subpixel disposed in the 1-1 unit pixel adjacent to the 1-2 unit pixel. Further, the red color absent in the 1-3 unit pixel can be compensated with the R subpixel disposed in the 1-4 unit pixel adjacent to the 1-3 unit pixel, and the blue color absent in the 1-4 unit pixel can be compensated with the B subpixel disposed in the 1-3 unit pixel adjacent to the 1-4 unit pixel.

Further, two adjacent unit pixels disposed on the first row of the second display panel PNL2 include a 2-1 unit pixel including the B and G subpixels at the left end LE2 of the row and a 2-2 unit pixel including the R and G subpixels. Two adjacent unit pixels disposed on the second row includes a 2-3 unit pixel including the R and G subpixels and a 2-4 unit pixel including the B and G subpixels.

Accordingly, the red color absent in the 2-1 unit pixel can be compensated with the R subpixel disposed in the 2-2 unit pixel adjacent to the 2-1 unit pixel, and the blue color absent in the 2-2 unit pixel can be compensated with the B subpixel disposed in the 2-1 unit pixel adjacent to the 2-2 unit pixel. Further, the blue color absent in the 2-3 unit pixel can be compensated with the B subpixel disposed in the 2-4 unit pixel adjacent to the 2-3 unit pixel, and the red color absent in the 2-4 unit pixel can be compensated with the R subpixel disposed in the 2-3 unit pixel adjacent to the 2-4 unit pixel.

The left eye image displayed on the first display panel PNL1 and the right eye image displayed on the second display panel PNL2 are respectively input through the left eye and the right eye and are combined in the brain. As a result, as shown in FIG. 14B, all of the unit pixels can represent the red, green, and blue colors through a combination of the 1-1 unit pixel (including the R and G subpixels) and the 2-1 unit pixel (including the B and G subpixels), a combination of the 1-2 unit pixel (including the B and G subpixels) and the 2-2 unit pixel (including the R and G subpixels), a combination of the 1-3 unit pixel (including the B and G subpixels) and the 2-3 unit pixel (including the R and G subpixels), and a combination of the 1-4 unit pixel (including the R and G subpixels) and the 2-4 unit pixel (including the B and G subpixels).

Accordingly, the second example of the pixel array structure according to the embodiment of the invention can increase the pixel density of the color while maintaining the resolution of the display device.

Figure 15A:
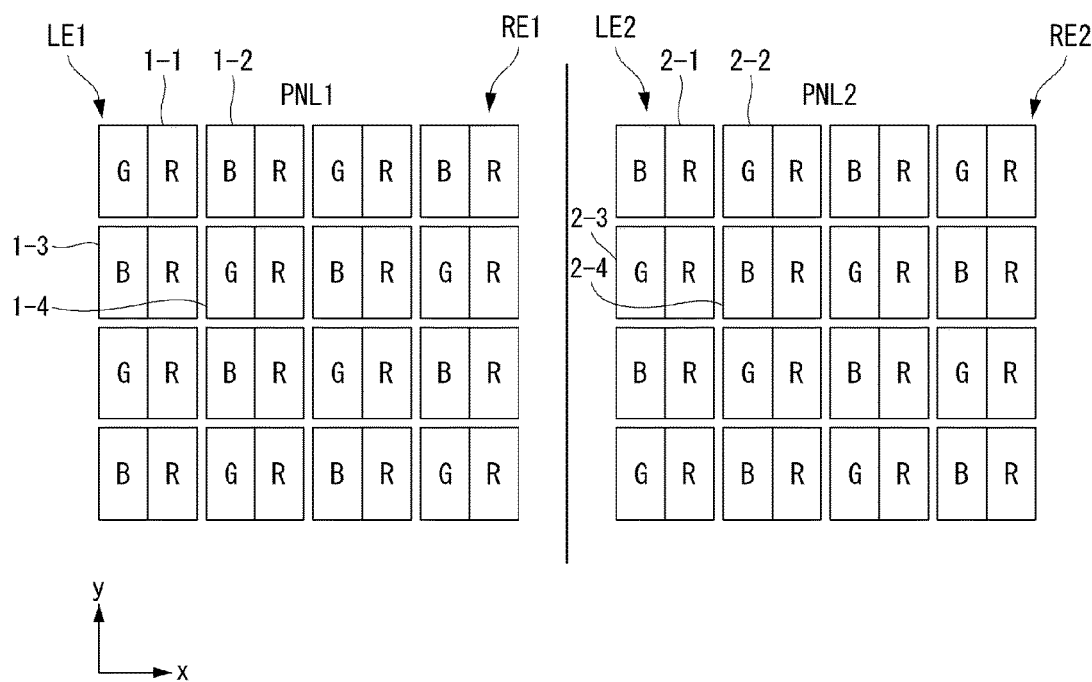
FIG. 15A shows a third example of pixel arrays of first and second display panels of a display device for a personal immersive device according to an exemplary embodiment of the invention.
Figure 15B:
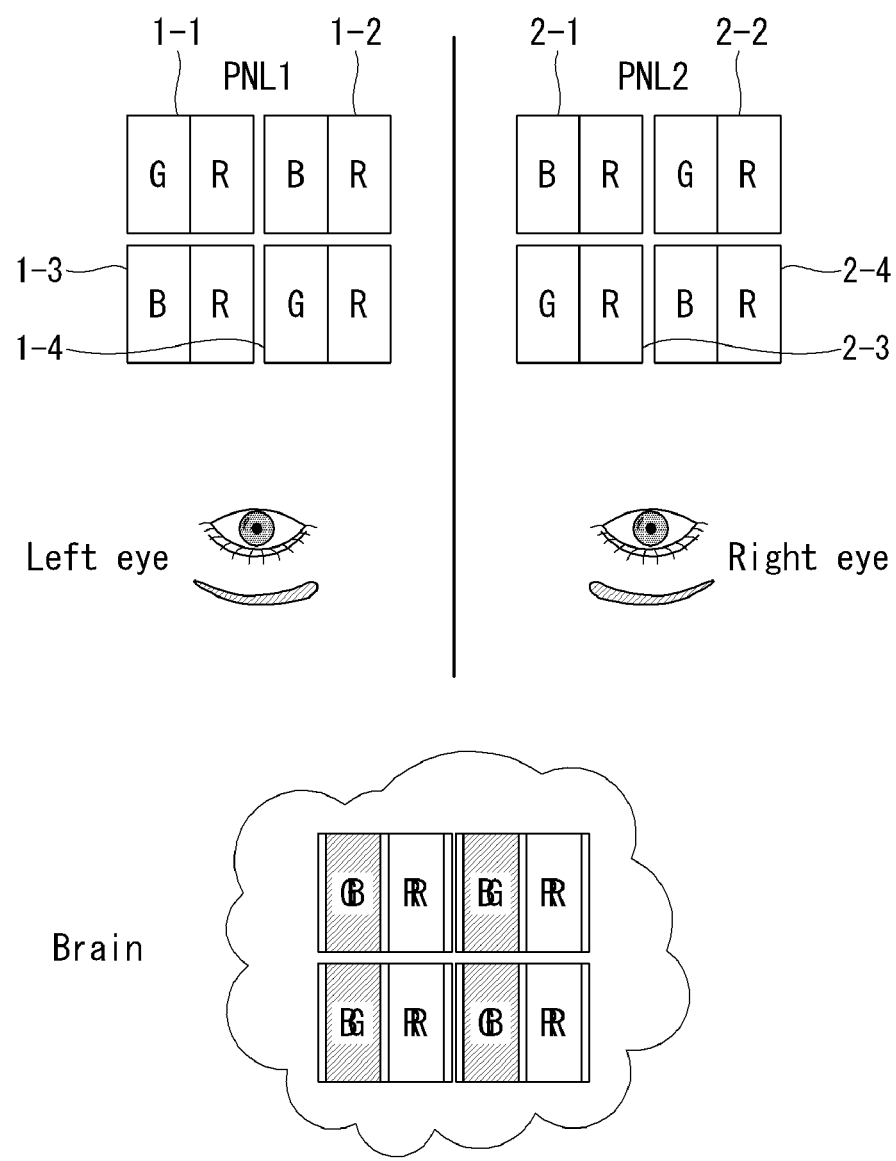
FIG. 15B illustrates an arrangement of colors obtained by combining and recognizing a left eye image and a right eye image in a brain in accordance with configuration of the pixel arrays of FIG. 15A.

FIG. 15A shows a third example of pixel arrays of the first and second display panels PNL1 and PNL2 of the display device for the personal immersive device according to the embodiment of the invention. FIG. 15B illustrates an arrangement of colors obtained by combining and recognizing a left eye image and a right eye image in a brain in accordance with configuration of the pixel array of FIG. 15A.

Referring to FIG. 15A, the pixel arrays are similar to those shown in FIGS. 13A and 14A, but now include different repeating pixel arrangements. Two types of unit pixels are mixed together in the panels. One type of unit pixel includes G and R subpixels but no B subpixels. Another type of unit pixel includes B and R subpixels but no G subpixels.

A first row of the first display panel PNL1 repeats an arrangement where G, R, B, and R subpixels form two unit pixels. As a result, the first row of display panel PNL1 includes an alternating GR-BR unit pixel arrangement. A second row of the first display panel PNL1 repeats an arrangement where B, R, G, and R subpixels form two unit pixels. As a result, the second row of display panel PNL1 includes an alternating BR-GR unit pixel arrangement. In the first display panel PNL1, odd-numbered rows (for example, a third row) repeat the same arrangement as the first row, and even-numbered rows (for example, a fourth row) repeat the same arrangement as the second row.

Further, a first row of the second display panel PNL2 repeats an arrangement where B, R, G, and R subpixels form two unit pixels. As a result, the first row of display panel PNL2 includes the alternating BR-GR pixel arrangement. A second row of the second display panel PNL2 repeats an arrangement where G, R, B, and R subpixels form two unit pixels. As a result, the second row of display panel PNL2 includes the alternating GR-BR pixel arrangement.

Alternatively, the first row of the first display panel PNL1 may repeat an arrangement where B, R, G, and R subpixels form two unit pixels, and a second row of the first display panel PNL1 may repeat an arrangement where G, R, B, and R subpixels form two unit pixels. In the first display panel PNL1, the odd-numbered rows may repeat the same arrangement as the first row, and the even-numbered rows may repeat the same arrangement as the second row.

In this instance, the first row of the second display panel PNL2 may repeat an arrangement where G, R, B, and R subpixels form two unit pixels, and the second row of the second display panel PNL2 may repeat an arrangement where B, R, G, and R subpixels form two unit pixels.

According to the third example of the pixel array structure according to the embodiment of the invention, two adjacent unit pixels disposed on the first pixel row of the first display panel PNL1 include a 1-1 unit pixel including the G and R subpixels at the left end LE1 of the first pixel row and a 1-2 unit pixel including the B and R subpixels, and two adjacent unit pixels disposed on the second row includes a 1-3 unit pixel including the B and R subpixels and a 1-4 unit pixel including the G and R subpixels.

Accordingly, the blue color absent in the 1-1 unit pixel can be compensated with the B subpixel disposed in the 1-2 unit pixel adjacent to the 1-1 unit pixel, and the green color absent in the 1-2 unit pixel can be compensated with the G subpixel disposed in the 1-1 unit pixel adjacent to the 1-2 unit pixel. Further, the green color absent in the 1-3 unit pixel can be compensated with the G subpixel disposed in the 1-4 unit pixel adjacent to the 1-3 unit pixel, and the blue color absent in the 1-4 unit pixel can be compensated with the B subpixel disposed in the 1-3 unit pixel adjacent to the 1-4 unit pixel.

Further, two adjacent unit pixels disposed on the first row of the second display panel PNL2 include a 2-1 unit pixel including the B and R subpixels at the left end LE2 of the first pixel row and a 2-2 unit pixel including the G and R subpixels, and two adjacent unit pixels disposed on the second row includes a 2-3 unit pixel including the G and R subpixels and a 2-4 unit pixel including the B and R subpixels.

Accordingly, the green color absent in the 2-1 unit pixel can be compensated with the G subpixel disposed in the 2-2 unit pixel adjacent to the 2-1 unit pixel, and the blue color absent in the 2-2 unit pixel can be compensated with the B subpixel disposed in the 2-1 unit pixel adjacent to the 2-2 unit pixel. Further, the blue color absent in the 2-3 unit pixel can be compensated with the B subpixel disposed in the 2-4 unit pixel adjacent to the 2-3 unit pixel, and the green color absent in the 2-4 unit pixel can be compensated with the G subpixel disposed in the 2-3 unit pixel adjacent to the 2-4 unit pixel.

The left eye image displayed on the first display panel PNL1 and the right eye image displayed on the second display panel PNL2 are respectively input through the left eye and the right eye and are combined in the brain. As a result, as shown in FIG. 15B, all of the unit pixels can represent the red, green, and blue colors through a combination of the 1-1 unit pixel (including the G and R subpixels) and the 2-1 unit pixel (including the B and R subpixels), a combination of the 1-2 unit pixel (including the B and R subpixels) and the 2-2 unit pixel (including the G and R subpixels), a combination of the 1-3 unit pixel (including the B and R subpixels) and the 2-3 unit pixel (including the G and R subpixels), and a combination of the 1-4 unit pixel (including the G and R subpixels) and the 2-4 unit pixel (including the B and R subpixels).

Accordingly, the third example of the pixel array structure according to the embodiment of the invention can increase the pixel density of the color while maintaining the resolution of the display device.

Although embodiments have been described with reference to a number of illustrative embodiments thereof, it should be understood that numerous other modifications and embodiments can be devised by those skilled in the art that will fall within the scope of the principles of this disclosure. For example, in the embodiments of the invention, the arrangement of the unit pixels of the first pixel array and the arrangement of the unit pixels of the second pixel array may be configured to have a mirror-image relationship. Thus, various variations and modifications are possible in the component parts and/or arrangements of the subject combination arrangement within the scope of the disclosure, the drawings and the appended claims.

What is claimed is:

1. A display device for virtual reality, the display device comprising:
  a first display panel for displaying an image for a left eye; and
  a second display panel for displaying an image for a right eye,
  wherein the first display panel comprises a first pixel row having a first end and a second end that is closer to the second display panel than the first end, the first pixel row having a first arrangement of unit pixels that alternate between a first unit pixel type and a second unit pixel type, the first unit pixel type comprising subpixels of a first color and a second color but not a third color, and the second unit pixel type comprising subpixels of the third color and the second color but not the first color,
  wherein the second display panel comprises a second pixel row aligned with the first pixel row and having a third end and a fourth end that is further from the first display panel than the third end, the second pixel row having a second arrangement of unit pixels that alternate between the second unit pixel type and the first unit pixel type,
  wherein a first unit pixel at the first end of the first pixel row is the first unit pixel type, and a second unit pixel at the third end of the second pixel row is the second unit pixel type, and
  wherein color arrangements of unit pixels of the first display panel and the second display panel are different from each other and a pixel density of the color is increased when the image for the left eye and the image for the right eye image are combined.

2. The display device of claim 1, wherein the first unit pixel type comprises subpixels of a red color and a blue color but not a green color, and the second unit pixel type comprises subpixels of the green color and the blue color but not the red color.

3. The display device of claim 1, wherein the first unit pixel type comprises subpixels of a red color and a green color but not a blue color, and the second unit pixel type comprises subpixels of the blue color and the green color but not the red color.

4. The display device of claim 1, wherein the first unit pixel type comprises subpixels of a green color and a red color but not a blue color, and the second unit pixel type comprises subpixels of the blue color and the red color but not the green color.

5. The display device of claim 1, wherein
  the first display panel comprises a third pixel row having the second arrangement of unit pixels, the third pixel row having a third unit pixel of the second unit pixel type, the third unit pixel in a same pixel column as the first unit pixel of the first pixel row; and
  the second display panel comprises a fourth pixel row having the first arrangement of unit pixels, the fourth pixel row having a fourth unit pixel of the first unit pixel type, the fourth unit pixel in a same pixel column as the second unit pixel of the second pixel row.

6. A display device for virtual reality, the display device comprising:
  a first display panel for displaying an image for a left eye; and
  a second display panel for displaying an image for a right eye, the first display panel and the second display panel both having a mix of unit pixels that include a first unit pixel type and a second unit pixel type, the first unit pixel type comprising subpixels of a first color and a second color but not a third color, and the second unit pixel type comprising subpixels of the third color and the second color but not the first color,
  wherein the first display panel comprises a first pixel row having a first end and a second end that is closer to the second display panel than the first end,
  wherein the second display panel comprises a second pixel row aligned with the first pixel row and having a third end and a fourth end that is further from the first display panel than the third end, wherein a first unit pixel at the first end of the first pixel row is the first unit pixel type, and a second unit pixel at the third end of the second pixel row is the second unit pixel type, and wherein color arrangements of unit pixels of the first display panel and the second display panel are different from each other and a pixel density of the color is increased when the image for the left eye and the image for the right eye image are combined.

7. The display device of claim 6, wherein the first unit pixel type comprises subpixels of a red color and a blue color but not a green color, and the second unit pixel type comprises subpixels of the green color and the blue color but not the red color.

8. The display device of claim 6, wherein the first unit pixel type comprises subpixels of a red color and a green color but not a blue color, and the second unit pixel type comprises subpixels of the blue color and the green color but not the red color.

9. The display device of claim 6, wherein the first unit pixel type comprises subpixels of a green color and a red color but not a blue color, and the second unit pixel type comprises subpixels of the blue color and the red color but not the green color.

10. The display device of claim 6, wherein the first display panel comprises a third pixel row having a third unit pixel of the second unit pixel type, the third unit pixel in a same pixel column as the first unit pixel of the first pixel row; and the second display panel comprises a fourth pixel row having a fourth unit pixel of the first unit pixel type, the fourth unit pixel in a same pixel column as the second unit pixel of the second pixel row.

11. A display device comprising:

a first display panel displaying an image for a left eye, the first display panel having unit pixels that include a first unit pixel and a second unit pixel, and each unit pixel of the first display panel including two subpixels from a red subpixel, a green subpixel and a blue subpixel, the first unit pixel including a subpixel of the same color as any one of subpixels included in the second unit pixel adjacent to the first unit pixel and a subpixel of a color absent in the second unit pixel; and a second display panel displaying an image for a right eye, the second display panel having unit pixels that include a third unit pixel and a fourth unit pixel, the third unit pixel corresponding to the first unit pixel and the fourth unit pixel corresponding to the second unit pixel, the third unit pixel having a same subpixel arrangement as the second unit pixel, and the fourth unit pixel having a same subpixel arrangement as the first unit pixel, wherein the color absent in the unit pixel of each of the first and second display panels is disposed in another unit pixel adjacent to the unit pixel and a color of the unit pixel of the image for the left eye is different from a color of the corresponding unit pixel of the image for the right eye, and the image for the left eye and the image for the right eye image are combined so that all of colors are represented on each unit pixel, thereby increasing the pixel density of the color while maintaining a resolution of the display device.

12. The display device of claim 11, wherein a second unit pixel in a second row of the first display panel has a same arrangement as the first unit pixel in a first row of the first display panel, and a first unit pixel in a second row of the first display panel has a same arrangement as the second unit pixel in a first row of the first display panel.

13. The display device of claim 12, wherein a second unit pixel in a second row of the second display panel has a same arrangement as the first unit pixel in a first row of the second display panel, and a first unit pixel in a second row of the second display panel has a same arrangement as the second unit pixel in a first row of the second display panel.

14. The display device of claim 11, wherein a distance between a center of the first display panel and a center of the second display panel is same as a distance between both eyes of a user.

15. The display device of claim 11, wherein each of the first display panel and the second display panel has a landscape type aspect ratio so that a length of the first display panel and the second display panel in a horizontal direction is longer than a length of the first display panel and the second display panel in a vertical direction.

16. The display device of claim 11, wherein a duty ratio of the pixels in the first display panel and the second display panel has a value equal to or less than 50%.

17. The display device of claim 11, wherein switching elements and driving elements of the pixels of each of the first display panel and the second display panel include a n-type metal oxide semiconductor field effect transistor (MOSFET).

* * * * *